US012698883B2

(12) United States Patent
Cheng

(10) Patent No.: US 12,698,883 B2
(45) Date of Patent: Aug. 4, 2026

(54) LIGHT-EMITTING DEVICE AND DISPLAY DEVICE INCLUDING THE SAME

(71) Applicant: Lextar Electronics Corporation, Hsinchu City (TW)

(72) Inventor: Hsu Wen Cheng, Hsinchu (TW)

(73) Assignee: Ennostar Corporation, Hsinchu City (TW)

( * ) Notice: Subject to any disclaimer, the term of this patent is extended or adjusted under 35 U.S.C. 154(b) by 0 days.

(21) Appl. No.: 19/242,448

(22) Filed: Jun. 18, 2025

(65) Prior Publication Data

US 2025/0383062 A1 Dec. 18, 2025

(30) Foreign Application Priority Data

Jun. 18, 2024 (TW) ................................ 113122464

(51) Int. Cl.
*F21V 5/00* (2018.01)
*F21Y 105/10* (2016.01)
*F21Y 113/00* (2016.01)

(52) U.S. Cl.
CPC ........... *F21V 5/007* (2013.01); *F21Y 2105/10* (2016.08); *F21Y 2113/00* (2013.01)

(58) Field of Classification Search
CPC .. F21V 5/007; F21Y 2105/10; F21Y 2113/00; H10H 29/853; H10H 29/24
See application file for complete search history.

(56) References Cited

U.S. PATENT DOCUMENTS

| | | | | |
|---|---|---|---|---|
| 2007/0195534 | A1 | 8/2007 | Ha et al. | |
| 2016/0053965 | A1 | 2/2016 | Oh et al. | |
| 2016/0230954 | A1* | 8/2016 | Ha | G02B 19/0061 |
| 2016/0265741 | A1* | 9/2016 | Yamada | B29D 11/0074 |
| 2016/0356453 | A1* | 12/2016 | Ji | H10H 20/855 |
| 2017/0074484 | A1* | 3/2017 | Ha | G02B 19/0014 |
| 2018/0366617 | A1* | 12/2018 | Yamada | H10H 20/841 |
| 2022/0173285 | A1* | 6/2022 | Sasaoka | H10H 20/854 |

(Continued)

FOREIGN PATENT DOCUMENTS

| | | |
|---|---|---|
| CN | 103236488 A | 8/2013 |
| CN | 108281537 A | 7/2018 |

(Continued)

*Primary Examiner* — Christopher E Dunay
(74) *Attorney, Agent, or Firm* — Patterson + Sheridan, LLP

(57) ABSTRACT

A light-emitting device and a display device are provided. The light-emitting device includes a substrate, a light-emitting element, and a light-transmissive encapsulant. The light-emitting element is disposed on the substrate. The light-transmissive encapsulant is disposed on the substrate and surrounds the light-emitting element. The light-transmissive encapsulant has an upper surface and a bottom surface. The light-transmissive encapsulant includes a recessed portion and a surrounding portion. The recessed portion is located on the upper surface, directly above the light-emitting element. The recessed portion includes a bottom portion and a sidewall surrounding the bottom portion. The surrounding portion is located on the upper surface and connected to the sidewall of the recessed portion. The surrounding portion extends outward to the bottom surface. A ratio of a width of the bottom portion to a width of the light-emitting element is greater than or equal to 0.3.

14 Claims, 17 Drawing Sheets

(56) References Cited

U.S. PATENT DOCUMENTS

| | | | | |
|---|---|---|---|---|
| 2022/0393069 | A1* | 12/2022 | Jo | H10H 20/8312 |
| 2024/0136476 | A1* | 4/2024 | Kayama | H10H 20/8506 |
| 2025/0231439 | A1* | 7/2025 | Tamura | G02F 1/133603 |
| 2025/0305657 | A1* | 10/2025 | Kayama | F21V 7/0083 |

FOREIGN PATENT DOCUMENTS

| | | | |
|---|---|---|---|
| JP | 7108205 | B2 | 7/2022 |
| TW | 201345000 | A | 11/2013 |

* cited by examiner (a) (b) (c)

LIGHT-EMITTING DEVICE AND DISPLAY DEVICE INCLUDING THE SAME

CROSS REFERENCE TO RELATED APPLICATIONS

This application claims priority of Taiwan Patent Application No. TW 113122464, filed on Jun. 18, 2024, the entirety of which is incorporated by reference herein.

TECHNICAL FIELD

Some embodiments of the present disclosure relate to a light-emitting device and a display device including the same, and, in particular, they relate to a light-emitting device that improves the light-emitting angle, and a display device including the same.

BACKGROUND

Existing light-emitting diode (LED) devices have issues such as difficulty in adjusting the light spot shape and/or non-uniform brightness.

Thus, although existing light-emitting devices and display devices including the same have gradually met their intended purposes, they still do not fully satisfy all requirements. Therefore, there are still some problems to be overcome regarding light-emitting devices and display devices including the same.

SUMMARY

In some embodiments, a light-emitting device is provided. The light-emitting device includes a substrate, a light-emitting element, and a light-transmissive encapsulant. The light-emitting element is disposed on the substrate. The light-transmissive encapsulant is disposed on the substrate and surrounds the light-emitting element. The light-transmissive encapsulant has an upper surface and a bottom surface. The bottom surface has a first width. The light-transmissive encapsulant includes a recessed portion and a surrounding portion. The recessed portion is located on the upper surface, directly above the light-emitting element. The recessed portion includes a bottom portion and a sidewall surrounding the bottom portion. The surrounding portion is located on the upper surface. The surrounding portion is connected to the sidewall of the recessed portion. The surrounding portion extends outward to the bottom surface. Wherein, a ratio of a second width of the bottom portion to a third width of the light-emitting element is greater than or equal to 0.3.

In some embodiments, a display device is provided. The display device includes the light-emitting device and an optical layer disposed above the light-emitting device.

The light-emitting device and the display device of the present disclosure may be applied in various types of electronic apparatus. In order to make the features and advantages of some embodiments of the present disclosure more understand, some embodiments of the present disclosure are listed below in conjunction with the accompanying drawings, and are described in detail as follows.

BRIEF DESCRIPTION OF THE DRAWINGS

The present disclosure can be more fully understood from the following detailed description when read in conjunction with the accompanying drawings. It should be noted that, according to the standard practice in the industry, the various features are not drawn to scale. In fact, the dimensions of the various features may be arbitrarily increased or reduced for clarity.

DETAILED DESCRIPTION

Figure 1:
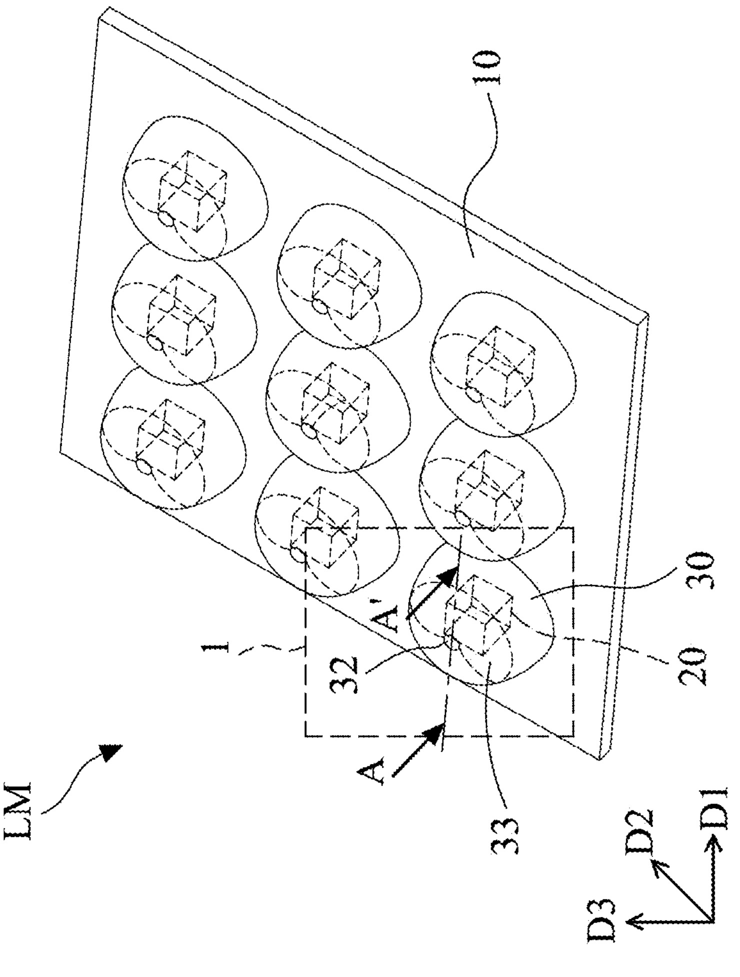
FIG. 1 is a schematic three-dimensional diagram showing a light-emitting module according to some embodiments of the present disclosure.

The light-emitting devices and the display devices of various embodiments of the present disclosure will be described in detail below. It should be understood that the following description provides many different embodiments for implementing various aspects of some embodiments of the present disclosure. The specific elements and arrangements described below are merely to clearly describe some embodiments of the present disclosure. Of course, these are only used as examples rather than limitations of the present disclosure. Furthermore, similar or corresponding reference numerals may be used in different embodiments to designate similar or corresponding elements in order to clearly describe the present disclosure. However, the use of these similar or corresponding reference numerals is only for the purpose of simply and clearly description of some embodiments of the present disclosure, and does not imply any correlation between the different embodiments or structures discussed.

It should be understood that relative terms, such as "lower", "bottom", "higher", or "top" may be used in various embodiments to describe the relative relationship of one element of the drawings to another element. It will be understood that if the device in the drawings were turned upside down, elements described on the "lower" side would become elements on the "upper" side. The embodiments of the present disclosure can be understood together with the drawings, and the drawings of the present disclosure are also regarded as a portion of the disclosure.

Furthermore, when it is mentioned that a first material layer is located on or over a second material layer, it may include the embodiment which the first material layer and the second material layer are in direct contact and the embodiment which the first material layer and the second material layer are not in direct contact with each other, that is one or more layers of other materials is between the first material layer and the second material layer. However, if the first material layer is directly on the second material layer, it means that the first material layer and the second material layer are in direct contact.

In addition, it should be understood that ordinal numbers such as "first", "second", and the like used in the description and claims are used to modify elements and are not intended to imply and represent the element(s) have any previous ordinal numbers, and do not represent the order of a certain element and another element, or the order of the manufacturing method, and the use of these ordinal numbers is only used to clearly distinguished an element with a certain name and another element with the same name. The claims and the specification may not use the same terms, for example, a first element in the specification may be a second element in the claim.

In some embodiments of the present disclosure, terms related to bonding and connection, such as "connect", "interconnect", "bond", and the like, unless otherwise defined, may refer to two structures in direct contact, or may also refer to two structures not in direct contact, that is there is another structure disposed between the two structures. Moreover, the terms related to bonding and connection can also include embodiments in which both structures are movable, or both structures are fixed. Furthermore, the terms "electrically connected" or "electrically coupled" include any direct and indirect means of electrical connection.

Herein, the terms "approximately", "about", and "substantially" generally mean within 10%, within 5%, within 3%, within 2%, within 1%, or within 0.5% of a given value or range. The given value is an approximate value, that is, "approximately", "about", and "substantially" can still be implied without the specific description of "approximately", "about", and "substantially". The term "a range between a first value and a second value" or "a first value~a second value" means that the range includes the first value, the second value, and other values in between. Furthermore, any two values or directions used for comparison may have certain tolerance. If the first value is equal to the second value, it implies that there may be a tolerance within about 10%, within 5%, within 3%, within 2%, within 1%, or within 0.5% between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

Certain terms may be used throughout the specification and claims in the present disclosure to refer to specific elements. A person of ordinary skills in the art may refer to the same element by different terms. The present disclosure does not intend to distinguish between elements that have the same function but with different terms. In the following description and claims, terms such as "including", "containing", and "having" are open-ended words, so they should be interpreted as meaning "including but not limited to . . . ". Therefore, when the terms "including", "containing", and/or "having" is used in the description of the present disclosure, it designates the presence of corresponding features, regions, steps, operations, and/or elements, but does not exclude the presence of one or more corresponding features, regions, steps, operations, and/or elements.

It should be understood that, in the embodiments illustrated below, without departing from the spirit of the present disclosure, components in multiple different embodiments can be replaced, reorganized, and combined to complete other embodiments. Components in various embodiments can be used in any combination as long as they do not violate the spirit of the disclosure or conflict with each other.

Unless otherwise defined, all terms (including technical and scientific terms) used herein have the same meaning as commonly understood by a person of ordinary skills in the art. It is understood that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

Herein, the respective directions are not limited to three axes of the rectangular coordinate system, such as the X-axis, the Y-axis, and the Z-axis, and may be interpreted in a broader sense. For example, the X-axis, the Y-axis, and the Z-axis may be perpendicular to each other, or may represent different directions that are not perpendicular to each other, but the present disclosure is not limited thereto. For ease of description, hereinafter, the X-axis is a first direction D1 (the width direction), the Y-axis is a second direction D2 (the length direction), and the Z-axis is a third direction D3 (the height direction). In some embodiments, the schematic cross-sectional views of the present disclosure are schematic cross-sectional views observing the XZ plane. In some embodiments, the third direction D3 may be the normal direction of the substrate. In some embodiments, the term "forward light" may refer to the light traveling along the normal direction of the substrate 10.

It should be understood that, according to the embodiments of the present disclosure, the width, thickness, or height of each element, and the space or distance between elements, may be measured using a scanning electron microscope (SEM), an optical microscope (OM), a film thickness profiler (α-step), an ellipsometer, or another suitable methods. In detail, according to some embodiments, a cross-sectional structure image including an element to be measured may be obtained using a scanning electron microscope, and then the width, thickness, height, or angle of each element, and the space or the distance between elements, may also be measured.

In some embodiments, additional components may be added to the light-emitting device of the present disclosure. In some embodiments, some components of the light-emitting device of the present disclosure may be replaced or omitted. In some embodiments, additional operational steps may be provided before, during, and/or after the method of manufacturing the light-emitting device. In some embodiments, some of the operational steps may be replaced or omitted, and the order of some of the operational steps is interchangeable. Furthermore, it should be understood that some of the operational steps may be replaced or deleted for other embodiments of the method. Furthermore, in the present disclosure, the number and size of each component in the drawings are only for illustration and are not used to limit the scope of the present disclosure.

Referring to FIG. 1, it is a schematic three-dimensional diagram showing a light-emitting module LM according to some embodiments of the present disclosure light-emitting module LM. In some embodiments, the light-emitting module LM may include a plurality of light-emitting devices. For ease of explanation, FIG. 1 shows that the light-emitting module LM includes a plurality of light-emitting devices 1 arranged at intervals, but the present disclosure is not limited thereto. As shown in FIGS. 2 to 18, the light-emitting module LM may include light-emitting devices 2, 3, 4, 5, 6A, 6B, 6C, 6D, 7A, 7B, or a combination thereof. In some embodiments, the number of light-emitting devices may be adjusted according to light-emitting requirements. For the convenience of description, FIG. 1 shows nine light-emitting devices 1, but the present disclosure is not limited thereto. For example, the light-emitting module LM may include 1 to 1000 light-emitting devices 1.

Figure 2:
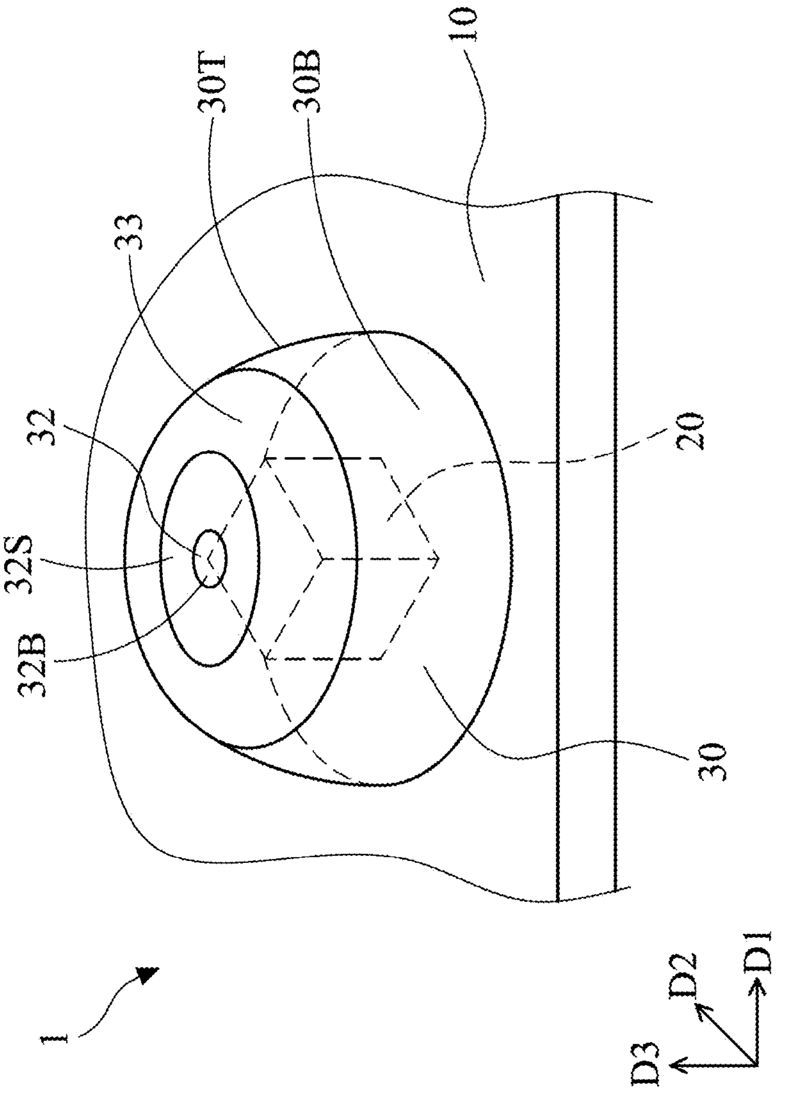
FIG. 2 is a schematic three-dimensional diagram showing a light-emitting device 1 according to some embodiments of the present disclosure.

Referring to FIG. 2, it shows a schematic three-dimensional diagram of a light-emitting device 1 according to some embodiments of the present disclosure. As shown in FIG. 1 and FIG. 2, in some embodiments, the light-emitting device 1 may include a substrate 10, a light-emitting element 20, and a light-transmissive encapsulant 30. In some embodiments, a substrate 10 including conductive wirings is provided. In some other embodiments, the substrate 10 may be a sapphire substrate, a silicon substrate, a glass substrate, a printed circuit board (PCB), a metal substrate, a ceramic substrate, the like, or a combination thereof, but the present disclosure is not limited thereto. In some embodiments, the substrate 10 may be a rigid substrate or a flexible substrate. In some embodiments, the substrate 10 may be a transparent substrate or an opaque substrate.

As shown in FIG. 1, in some embodiments, the light-emitting element 20 may be disposed on the substrate 10 and may be electrically connected to the conductive wirings of the substrate 10. In some embodiments, the light-emitting element 20 includes a light-emitting diode (LED) die, for example, an LED die that emits blue light, green light, red light, or UV light. The material of the LED die may be, for example, GaN, InGaN, AlGaN, AlInGaN, GaAlAs, AlInGaP, and the like, but the present disclosure is not limited thereto. In some embodiments, the light-emitting element 20 may be a die with smaller size, for example, mini light-emitting diode (mini LED) die or micro LED die, according to the requirement. In addition, the LED die may be disposed on the substrate 10 in a flip-chip configuration. In some embodiments, the light-emitting element 20 may be a chip scale package (CSP) LED, which includes an LED die and a phosphor film or a quantum dot film, and the phosphor film or the quantum dot film covers the upper surface and/or four side surfaces of the LED die.

As shown in FIG. 1, in some embodiments, a light-transmissive encapsulant 30 may be disposed on the substrate 10 and may surround and seal the light-emitting element 20. In some embodiments, the light-transmissive encapsulant 30 may cover the upper surface and the side surfaces of the light-emitting element 20.

In some embodiments, the light-transmissive encapsulant 30 includes a light-transmissive material, such as a light-transmissive resin, glass, the like, or a combination thereof, but the present disclosure is not limited thereto. In the embodiment of the light-transmissive encapsulant 30 including the light-transmissive resin, the light-transmissive encapsulant 30 may include acrylate resin, organic silicone resin, acrylate-modified polyurethane, acrylate-modified organic silicone resin, epoxy resin, silicone resin, the like, or a combination thereof, but the present disclosure is not limited thereto. In some embodiments, the light-transmissive encapsulant 30 may be formed by a dispensing process or by using a mold. Taking an LED die used as the light-emitting element 20 as an example, the Chip on Board (COB) technology may be used. As shown in FIG. 1, a plurality of LED dies (for example, mini LED dies) are directly disposed on the substrate 10 in a flip-chip configuration, and the LED dies are individually dispensed with a light-transmissive resin, so that the LED dies are encapsulated on the substrate. Then, after the light-transmissive resin is cured, a light-transmissive encapsulant 30 as shown in FIG. 1 may be obtained.

Furthermore, the light-transmissive encapsulant 30 may or may not include diffusion particles. The light-transmissive encapsulant 30 may or may not include a wavelength conversion material. Wherein, the wavelength conversion material may be, for example, phosphors, quantum dots, or a combination thereof. The light-emitting device 1 includes one or more light-emitting elements 20. For example, taking the light-emitting device 1 emitting white light as an example, the light-transmissive encapsulant 30 may include a yellow wavelength conversion material (for example, the yellow phosphor), the light-emitting element 20 may be a blue light LED die, the yellow wavelength conversion material absorbs the blue light emitted by the blue light LED die and converts it into yellow light, and then, white light may be generated by mixing the blue light and the yellow light. Alternatively, the light-transmissive encapsulant 30 may include a red wavelength conversion material (for example, the red phosphor or the red quantum dot) and a green wavelength conversion material (for example, the green phosphor or the green quantum dot), the red wavelength conversion material and the green wavelength conversion material absorb the blue light emitted by the blue LED dies and convert the blue light into red light and green light respectively, and then, the white light may be generated by mixing the blue light, the red light, and the green light. Alternatively, the light-emitting device 1 includes light-emitting elements 20 that emit different colors, for example, including a blue LED die, a red LED die, and a green LED die that emit blue light, red light, and green light respectively. Then, the white light may be generated after mixing the lights. Taking the light-emitting device 1 emitting blue light as an example, the light-emitting element 20 may be a blue light LED die. Taking the light-emitting device 1 emitting red light as an example, the light-emitting element 20 may be a red light LED die, or the light-emitting element 20 may be a blue light LED die and the light-transmissive encapsulant 30 may include a red wavelength conversion material, which absorbs the blue light emitted by the blue light LED die and converts it into red light.

In some embodiments, the light-emitting module LM may be used as a backlight module of a display device (for example, a backlight module of a liquid crystal display, or a backlight module of a vehicle dashboard), a vehicle light-emitting module, a lighting light-emitting module, and the like, but the present disclosure is not limited thereto.

The present disclosure provides a display device including a light-emitting module LM as shown in FIG. 1 as a backlight source. In some embodiments, the display device further includes an optical layer (not shown), and the optical layer may be disposed above the light-emitting device 1 of the light-emitting module LM. In some embodiments, there may be an optical distance (OD) between the bottom surface of the optical layer and the upper surface of the substrate 10 of the light-emitting device 1. In some embodiments, the optical distance may be greater than or equal to 4 mm and less than or equal to 12 mm. For example, the optical distance may be 4 mm, 5 mm, 6 mm, 7 mm, 8 mm, 9 mm, 10 mm, 11 mm, 12 mm, or any value or any range of values between the aforementioned values, but the present disclosure is not limited thereto. In some embodiments, the optical layer may include a wavelength conversion film containing phosphors or quantum dots, a diffuser film, a brightness enhancement film (BEF), and a dual brightness enhancement film (DBEF), the like, other suitable films/layers, or a combination thereof, but the present disclosure is not limited thereto.

Figure 3:
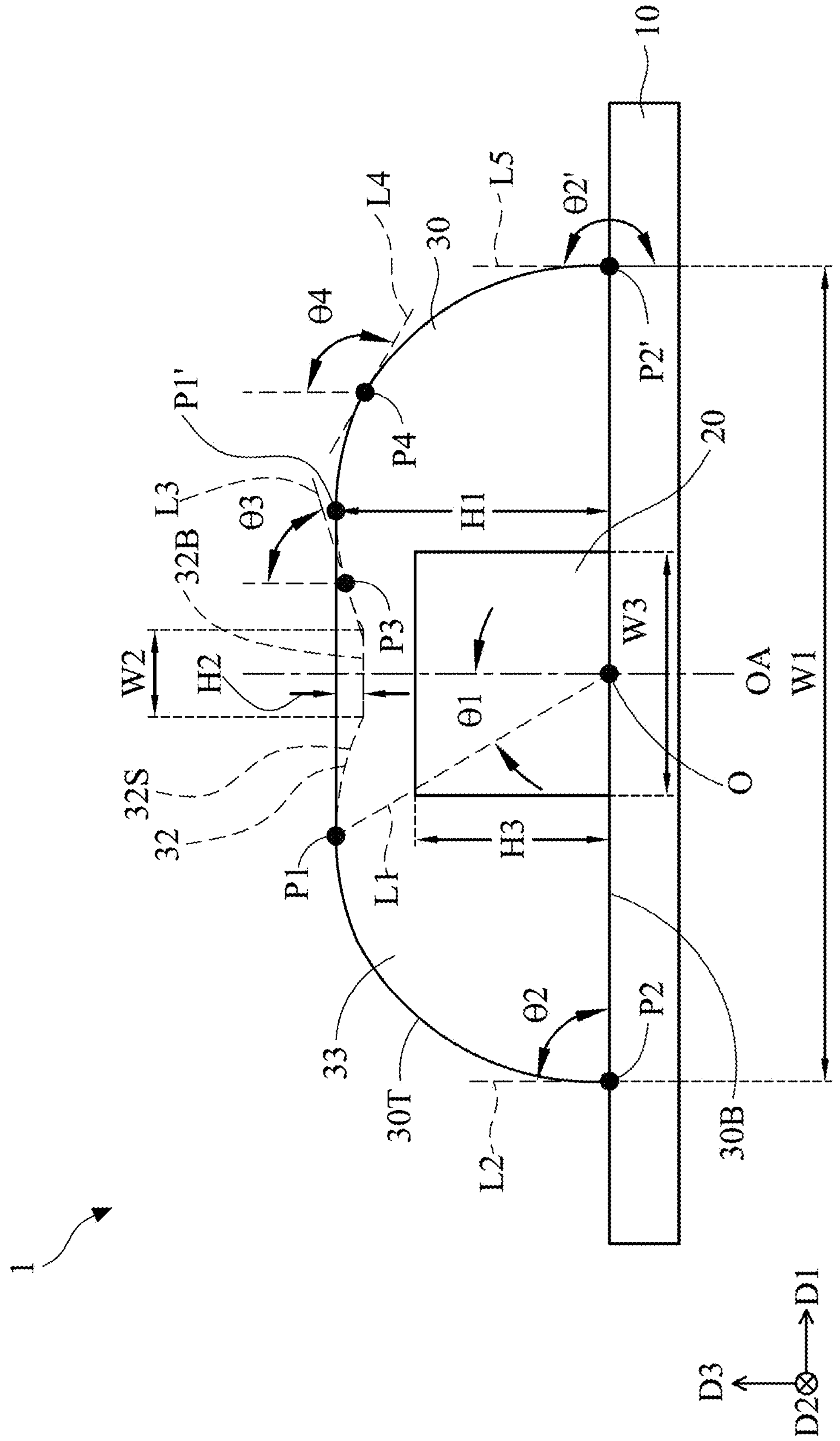
FIG. 3 is a schematic cross-sectional view of a light-emitting device 1 according to some embodiments of the present disclosure.

Referring to FIG. 3, it is a schematic cross-sectional view of the light-emitting device 1 along the cross section A-A' of FIG. 1 according to some embodiments of the present disclosure. As shown in FIG. 2 and FIG. 3, in some embodiments, the light-transmissive encapsulant 30 may have an upper surface 30T and a bottom surface 30B, and the upper surface 30T and the bottom surface 30B are opposite to each other in the normal direction of the substrate 10 (that is, the third direction D3).

As shown in FIG. 2, in some embodiments, the light-transmissive encapsulant 30 may include a recessed portion 32 and a surrounding portion 33. In some embodiments, the recessed portion 32 may be located on the upper surface 30T of the light-transmissive encapsulant 30, and the recessed portion 32 may be located directly above the light-emitting element 20. In some embodiments, the projection of the light-emitting element 20 on the substrate 10 may be located within the projection of the recessed portion 32 on the substrate 10. In some embodiments, the geometric center of the recessed portion 32 overlaps with the geometric center of the light-emitting element 20 in the normal direction of the substrate 10. In some embodiments, the recessed portion 32 may include a bottom portion 32B and a sidewall 32S surrounding the bottom portion 32B. In some embodiments, when viewed from a top view, the bottom portion 32B may have a circular, elliptical, rectangular, polygonal, or other similar shapes, but the present disclosure is not limited thereto.

As shown in FIG. 2, in some embodiments, the surrounding portion 33 may be located on the upper surface 30T of the light-transmissive encapsulant 30. The surrounding portion 33 may be connected to the sidewall 32S of the recessed portion 32, and the sidewall 32S may extend outward in a direction away from the recessed portion 32 to the bottom surface 30B of the light-transmissive encapsulant 30. In some embodiments, when viewed from a top view, the surrounding portion 33 may have a ring shape, a frame shape, or other similar shapes, but the present disclosure is not limited thereto.

As shown in FIG. 3, in some embodiments, in the first direction D1, the bottom surface 30B of the light-transmissive encapsulant 30 may have a first width W1, the bottom portion 32B of the recessed portion 32 may have a second width W2, and the light-emitting element 20 may have a third width W3. In some embodiments, the ratio of the second width W2 to the third width W3 (the second width W2/the third width W3) may be greater than or equal to 0.3. For example, the ratio of the second width W2 to the third width W3 may be 0.3, 0.4, 0.5, 0.6, 0.7, 0.8, 0.9, 1, 1.1, 1.2, 1.3, 1.4, 1.5, 2, 2.5, or any value or any range of values between the aforementioned values, but the present disclosure is not limited thereto. In some embodiments, the bottom portion 32B and the sidewall 32S of the recessed portion 32 together define a recessed opening of the recessed portion 32, and the size of the recessed opening may increase from the bottom portion 32B in a direction away from the substrate 10. In other words, the size of the recessed opening of the recessed portion 32 may increase along the normal direction of the substrate 10 (that is, the third direction D3). Accordingly, the sidewall 32S of the upper recessed portion 32 of the light-transmissive encapsulant 30 may be used to at least partially change the light path of the forward light emitted from the light-emitting element 20, while the bottom portion 32B of the recessed portion 32 may be used to avoid insufficient forward light intensity of the light-emitting element 20.

Figure 5:
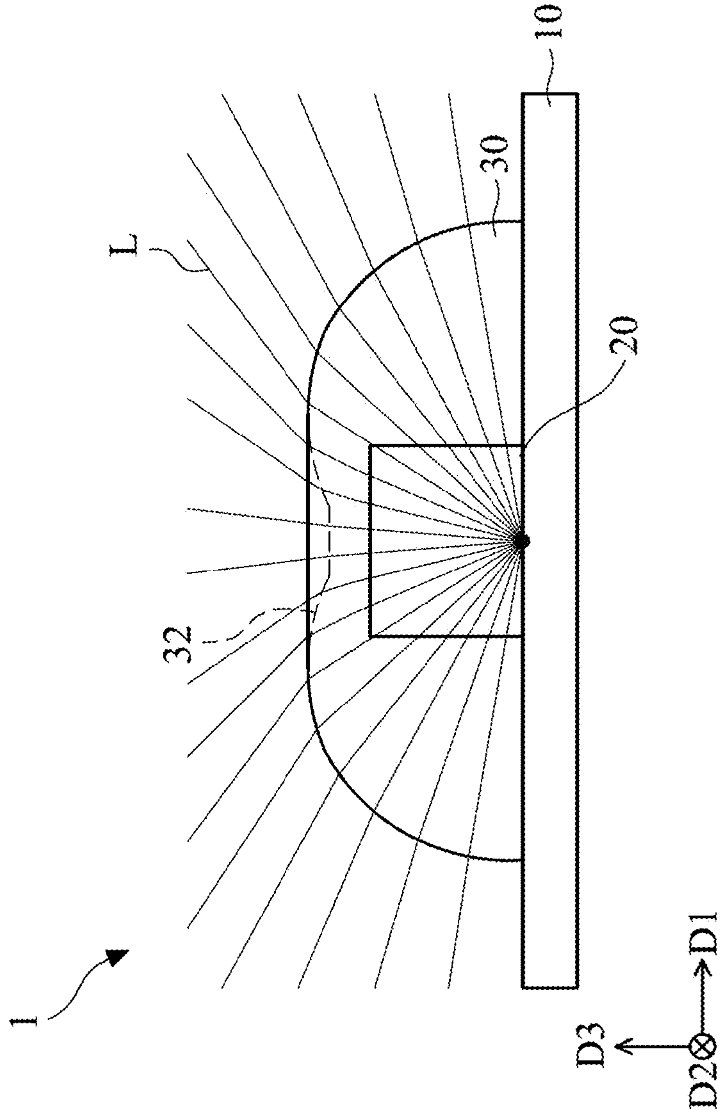
FIG. 5 is a schematic diagram showing an optical path of the light-emitting device 1 according to some embodiments of the present disclosure.

Referring to FIG. 5, it shows a schematic diagram of an optical path of the light-emitting device 1 according to some embodiments of the present disclosure. Even though the light spot size of the light-emitting element 20 itself is small, the light-transmissive encapsulant 30 of the present disclosure can help the light-emitting element 20 to increase the light-emitting angle, enlarge the light spot size, and make the brightness distribution more uniform, as shown in FIG. 3 and FIG. 5. In detail, since the upper surface of the light-transmissive encapsulant 30 of the present disclosure has the design of the recessed portion 32, the bottom portion 32B of the recessed portion 32 may be parallel to the upper surface of the light-emitting element 20. Therefore, when the second width W2 of the bottom portion 32B of the recessed portion 32 is greater, it can help a portion of the light to transport through the recessed portion 32, thereby increasing the luminous flux of the light passing through the recessed portion 32. Therefore, the light-emitting intensity directly above the light-emitting element 20 may be maintained. In addition, since the sidewall 32S of the recessed portion 32 may have a curved cross-section profile, the path of the light emitted from directly above the light-emitting element 20 may be at least partially changed, thereby expanding the light-emitting angle directly above the recessed portion 32. Therefore, the recessed portion 32 of the light-transmissive encapsulant 30 can adjust the forward light intensity, thereby preventing the problem of excessive brightness or darkness directly above the light-emitting device 1. Thus, a plurality of light-emitting devices 1 are applied to the light-emitting module LM as shown in FIG. 1, which can provide the light-emitting module LM with improved light uniformity.

As shown in FIG. 3, in some embodiments, the ratio of the second width W2 to the first width W1 (the second width W2/the first width W1) may be less than or equal to 0.5. For example, the ratio of the second width W2 to the first width W1 may be 0.5, 0.4, 0.3, 0.2, 0.1, 0.05, or any value or any range of values between the aforementioned values, but the present disclosure is not limited thereto. In some embodiments, the first width W1 and the second width W2 may satisfy the relationship: $0.5 \times W1 \geq W2 \geq 0.3 \times W3$. Specifically, when viewed from a cross-sectional view, the forward light intensity of the light-emitting device 1 in the normal direction (that is, the third direction D3) may be controlled by adjusting the width ratio of the recessed portion 32 to the light-transmissive encapsulant 30.

As shown in FIG. 3, in some embodiments, the ratio of the first width W1 to the third width W3 (the first width W1/the third width W3) may be greater than or equal to 1.5 and less than 5. For example, the ratio of the first width W1 to the third width W3 may be 1.5, 2, 2.5, 3, 3.5, 4, 4.5, 4.9, or any value or any range of values between the aforementioned values, but the present disclosure is not limited thereto. In some embodiments, the first width W1 and the third width W3 may satisfy the relationship: $5 > W1/W3 > 1.5$. Accordingly, by adjusting the size relationship between the light-transmissive packaging portion 30 and the light-emitting element 20, the light-transmissive packaging portion 30 suitable for the light-emitting element 20 is manufactured. In some embodiments, the ratio of the first width W1 to the third width W3 may be greater than 2. In some embodiments, the first width W1 and the third width W3 may satisfy the relationship: $0.5 \times W1 \geq W3$. Therefore, the light-transmissive encapsulant 30 of the present disclosure is helpful to improve the light-emitting angle of the light-emitting element 20. Specifically, when the light-emitting element 20 is a small-sized light source, for example, the light-emitting characteristics of the light-emitting element 20 may be similar to a point light source, the light-emitting angle and the light spot size may be increased through the light-transmissive encapsulant 30 disclosed herein.

As shown in FIG. 3, in some embodiments, the light-transmissive encapsulant 30 may have an optical axis OA that is parallel to the normal direction of the substrate 10, and the light-transmissive encapsulant 30 may use the optical axis OA as a symmetry axis. The optical axis OA may pass through the center (for example, a geometric center such as the center of a circle) of the bottom portion 32B of the recessed portion 32, and the optical axis OA may intersect the bottom surface 30B of the light-transmissive encapsulant 30 at an intersection point O. In some embodiments, the intersection point O may serve as a reference point. In some embodiments, the recessed portion 32 may include a downward-concave curved surface in a direction toward the upper surface of the substrate 10. In some embodiments, the surrounding portion 33 may include an upward-convex curved surface in a direction away from the upper surface of the substrate 10.

As shown in FIG. 3, in some embodiments, the curved surface of the surrounding portion 33 may have highest points, that is, the first points P1 and P1'. The first points P1 and P1' are on the same horizontal line. In some embodiments, in the third direction D3, the highest point (for example, the first point P1') of the curved surface may have a maximum height (which may be referred to as a first height H1) to the bottom surface 30B of the light-transmissive encapsulant 30. That is, the maximum height is between the highest point of the curved surface and the bottom surface 30B of the light-transmissive encapsulant 30. In some embodiments, in the third direction D3, the recessed portion 32 may have a depth (which may be referred to as a second height H2), and the top surface of the light-emitting element 20 to the bottom surface 30B of the light-transmissive encapsulant 30 may have a third height H3.

As shown in FIG. 3, in some embodiments, the ratio of the second height H2 to the first height H1 of the recessed portion 32 of the light-transmissive encapsulant 30 (the second height H2/the first height H1) may be greater than or equal to 0.05 and less than or equal to 0.5. For example, the ratio of the second height H2 to the first height H1 may be 0.05, 0.1, 0.15, 0.2, 0.25, 0.3, 0.35, 0.4, 0.45, 0.5, or any value or any range of values between the aforementioned values, but the present disclosure is not limited thereto. In some embodiments, the first height H1 and the second height H2 may satisfy the relationship: $0.5 \times H1 \geq H2 \geq 0.05 \times H1$. Accordingly, the arc-shaped cross-sectional profile of the sidewall 32S of the recessed portion 32 may be adjusted by adjusting the second height H2 of the recessed portion 32, thereby adjusting the forward light intensity of the light-emitting element 20. Wherein, when the second height H2 of the recessed portion 32 is too low, the forward light intensity is too high. When the second height H2 is too high, the forward light intensity is insufficient.

As shown in FIG. 3, in some embodiments, the ratio of the first height H1 to the third height H3 of the light-emitting element 20 (the first height H1/the third height H3) may be greater than 1.1 and less than 3. For example, the ratio of the first height H1 to the third height H3 may be 1.11, 1.2, 1.25, 1.5, 1.75, 2, 2.25, 2.5, 2.75, 2.9, or any value or any range of values between the aforementioned values, but the present disclosure is not limited thereto. In some embodiments, the first height H1 and the third height H3 may satisfy the relationship: $3 > H1/H3 > 1.1$. Accordingly, the light-emitting angle of the light-emitting element 20 may be adjusted. Specifically, when the size of the light-emitting element 20 is much smaller than the size of the light-transmissive encapsulant 30, the light-emitting characteristics of the light-emitting element 20 may be more similar to a point light source, thereby increasing the light-emitting angle.

As shown in FIG. 3, in some embodiments, the ratio of the first height H1 to the first width W1 of the bottom surface 30B of the light-transmissive encapsulant 30 (the first height H1/the first width W1) may be less than or equal to 0.5. For example, the ratio of the first height H1 to the first width W1 may be 0.49, 0.45, 0.4, 0.3, 0.2, or any value or any range of values between the aforementioned values, but the present disclosure is not limited thereto. In some embodiments, the first width W1 and the first height H1 may satisfy the relationship: $0.5 \times W1 \geq H1$. Accordingly, when the first width W1 is greater than the first height H1, the light-emitting angle of the light-emitting element 20 may be increased. Specifically, when the first height H1 of the light-transmissive encapsulant 30 is greater than the first width W1, the light-transmissive encapsulant 30 is prone to focus a light-in a narrow beam angle, which is not conducive to increasing the light-emitting angle.

As shown in FIG. 3, in some embodiments, the virtual connecting line L1 may connect the intersection point O as a reference point and the first point P1 of the curved surface of the surrounding portion 33, and a first angle θ1 between the virtual connecting line L1 and the optical axis OA may be greater than 10 degrees and less than 60 degrees. For example, the first angle θ1 may be 11 degrees, 15 degrees, 20 degrees, 25 degrees, 30 degrees, 35 degrees, 40 degrees, 45 degrees, 50 degrees, 55 degrees, 60 degrees, or any value or any range of values between the aforementioned values, but the present disclosure is not limited thereto. Accordingly, the light-emitting angle of the light-emitting element 20 may be increased. In detail, when the first angle θ1 is the specific value/range described above, the light-emitting characteristic of the light-emitting element 20 may be similar to a point light source, thereby increasing the light-emitting angle.

As shown in FIG. 3, in some embodiments, the second point P2 is the intersection point of the curved surface of the surrounding portion 33 and the substrate 10. Wherein, the second points P2 and P2' are on the same horizontal line. The tangent line L2 is a tangent line on the curved surface of the surrounding portion 33 that passes through the second point P2. In some embodiments, the second angle θ2 between the tangent line L2 and the upper surface of the substrate 10 may be less than or equal to 90 degrees. For example, the second angle θ2 may be 90 degrees, 85 degrees, 80 degrees, 70 degrees, 60 degrees, 50 degrees, 45 degrees, or any value or any range of values between the aforementioned values, but the present disclosure is not limited thereto. Accordingly, it is convenient to dispose the light-transmissive encapsulant 30. Specifically, when the light-transmissive encapsulant 30 is formed by the dispensing process, it is easy to form an arc-shaped cross-sectional profile due to the viscosity of the material. When the light-transmissive encapsulant 30 is formed by using the mold, demolding may be facilitated.

As shown in FIG. 3, in some embodiments, the third point P3 may be located on the sidewall 32S of the recessed portion 32, the fourth point P4 may be located on the curved surface of the surrounding portion 33, and the third point P3 and the fourth point P4 are respectively located on two sides of the highest point (for example, the first point P1'). A third angle θ3 between a tangent line L3 passing through the third point P3 and the optical axis OA may be smaller than a fourth angle θ4 between a tangent line LA passing through the fourth point P4 and the optical axis OA. Furthermore, the fourth angle θ4 between the tangent line L4 passing through the fourth point P4 and the optical axis OA may be smaller than a second angle θ2' between a tangent line L5 passing through the second point P2' and the optical axis OA. In some embodiments, the angle between the slope of each point on the upper surface 30T of the light-transmissive encapsulant 30 and the optical axis OA may increase as the distance from the optical axis OA increases. Accordingly, the upper surface 30T of the light-transmissive encapsulant 30 may have an arc-shaped cross-sectional profile in order to adjust the light spot shape and/or improve the brightness uniformity. In detail, the upper surface 30T of the light-transmissive encapsulant 30 may be streamlined, or the upper surface 30T of the light-transmissive encapsulant 30 may have a gradually changing slope. Therefore, the outer edge of the light spot may be made into an arc shape, and the generation of bright lines or dark lines may be avoided when the light-emitting is applied to a display. For the convenience of explanation, FIG. 3 shows the third angle θ3 and the fourth angle θ4 between the virtual line parallel to the optical axis OA and the tangent lines L3 and L4.

Figure 4:
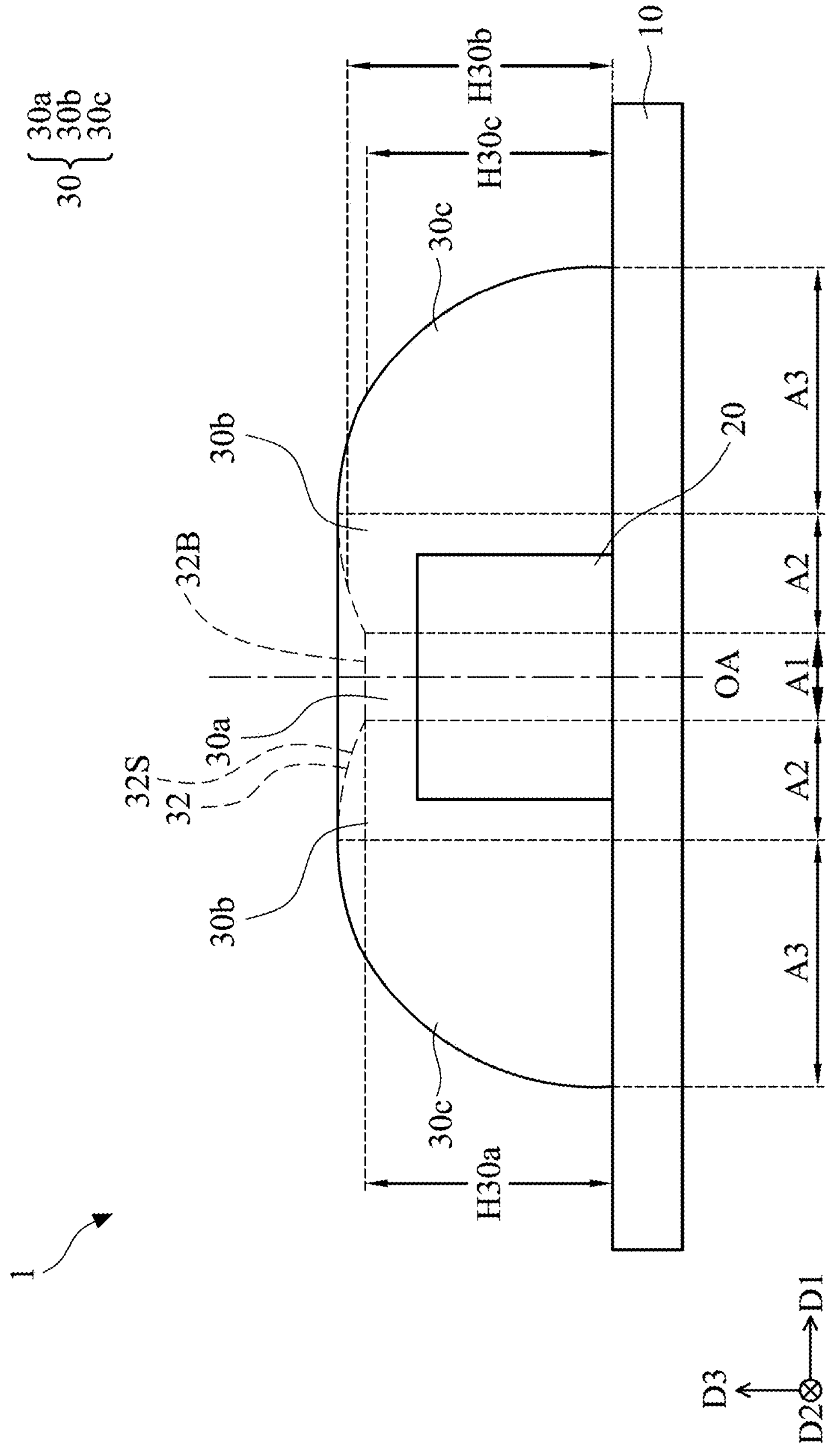
FIG. 4 is a schematic cross-sectional view of a light-emitting device 1 according to some embodiments of the present disclosure.

Referring to FIG. 4, it is a schematic cross-sectional diagram showing a light-emitting device 1 according to some embodiments of the present disclosure. FIG. 4 shows a cross section taken along the line A-A' in FIG. 1. In some embodiments, the light-transmissive encapsulant 30 may include a first portion 30*a* located in a first area A1, a second portion 30*b* located in a second area A2, and a third portion 30*c* located in a third area A3. In some embodiments, the second portion 30*b* may surround the first portion 30*a*, and the third portion 30*c* may surround the second portion 30*b*. In some embodiments, the first area A1, the second area A2, and the third area A3 may have the same virtual center of circle.

In some embodiments, the recessed portion 32 may be disposed on the first portion 30*a* and the second portion 30*b*, and not disposed on the third portion 30*c*. In some embodiments, along the third direction D3, the height H30*a* of the first portion 30*a* may be a constant value (a fixed value). Therefore, the recessed portion 32 may have a flat bottom portion 32B. In some embodiments, along the third direction D3, the height H30*b* of the second portion 30*b* may gradually increase along a direction away from the optical axis OA. In some embodiments, along the third direction D3, the height H30*c* of the third portion 30*c* may gradually decrease in a direction away from the optical axis OA. Accordingly, by adjusting the respective heights of the first portion 30*a*, the second portion 30*b*, and the third portion 30*c* in the light-transmissive encapsulant 30, the light-emitting angle and the light spot size may be increased, the forward light intensity may be adjusted, and the brightness distribution may be improved.

Referring to FIG. 5, it is a schematic diagram showing an optical path of the light-emitting device 1 according to some embodiments of the present disclosure. As shown in FIG. 5, in some embodiments, the light-emitting characteristics of the light-emitting element 20 may be similar to a point light source, and a light L emitted by the light-emitting element 20 may be distributed more widely through the light-transmissive encapsulant 30 disclosed herein.

Figure 6:
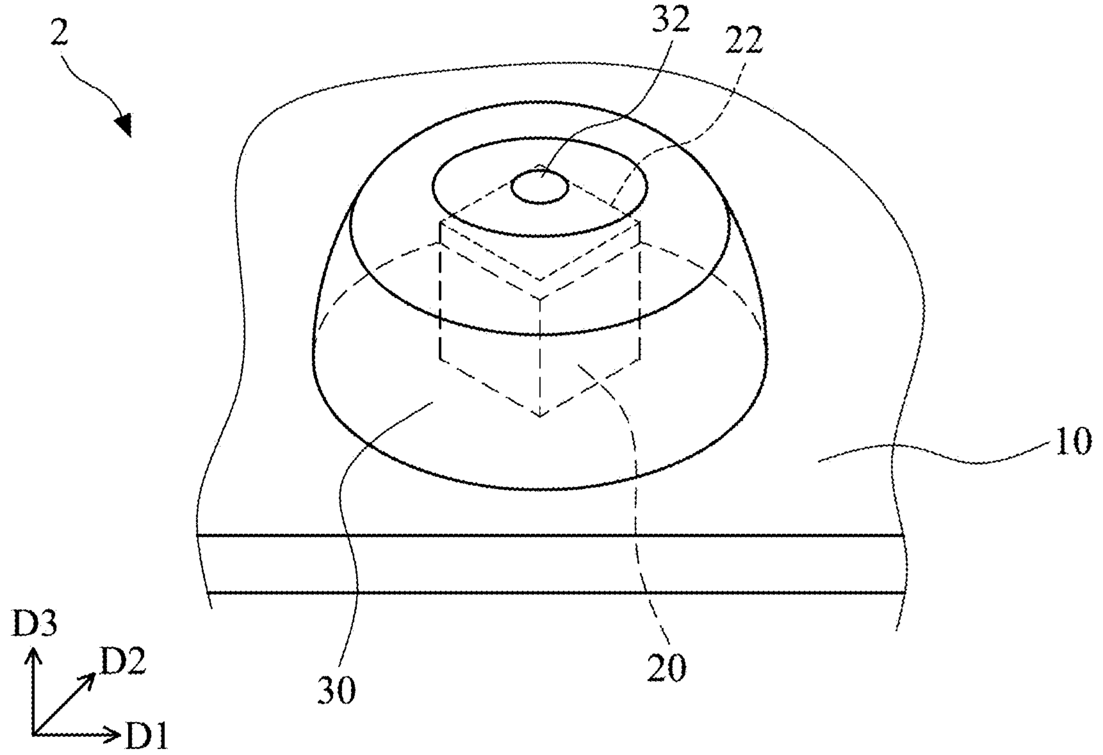
FIG. 6 is a schematic three-dimensional diagram showing a light-emitting device 2 according to some embodiments of the present disclosure.
Figure 7:
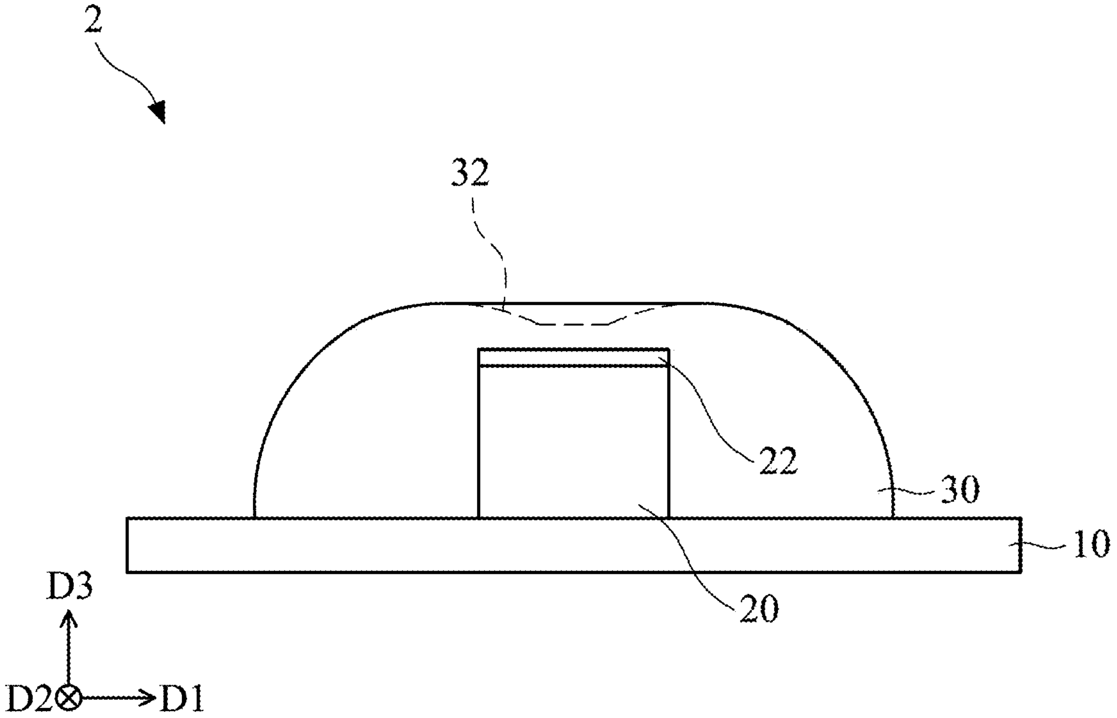
FIG. 7 is a schematic cross-sectional view of a light-emitting device 2 according to some embodiments of the present disclosure.

Referring to FIGS. 6 and 7, they are a schematic three-dimensional diagram and a schematic cross-sectional view showing a light-emitting device 2 according to some embodiments of the present disclosure, respectively. In some embodiments, the light pattern of the light emitted by the light-emitting element 20 has a batwing-shaped light distribution. For example, the side surface of the light-emitting element 20 may emit light with a large light-emitting angle. In some embodiments, the light-emitting element 20 may be an LED die, a CSP LED, or an LED packaging structure, which is capable of emitting light from the side surface. As shown in FIGS. 6 and 7, in some embodiments, the light-emitting device 2 may include an optical film 22, and the optical film 22 may be located on the upper surface of the light-emitting element 20. In some embodiments, the optical film 22 may be disposed between the light-emitting element 20 and the light-transmissive encapsulant 30. The optical film 22 may include a reflective material for reflecting a portion of the light emitted from the upper surface of the light-emitting element 20 to the side surface of the light-emitting element 20 for emission. In some embodiments, the reflective material may include metal, resin including white filler, dielectric material such as a distributed Bragg reflector (DBR), the like, or a combination thereof, but the present disclosure is not limited thereto. In some embodiments, the metal may include silver (Ag), aluminum (A1), copper (Cu), chromium (Cr), titanium (Ti), alloys thereof, the like, or a combination thereof. Accordingly, the light-emitting angle of the light-emitting element 20 may be increased. In some embodiments, the recessed portion 32 may cover the upper surface of the optical film 22 without exposing the optical film 22.

Figure 8:
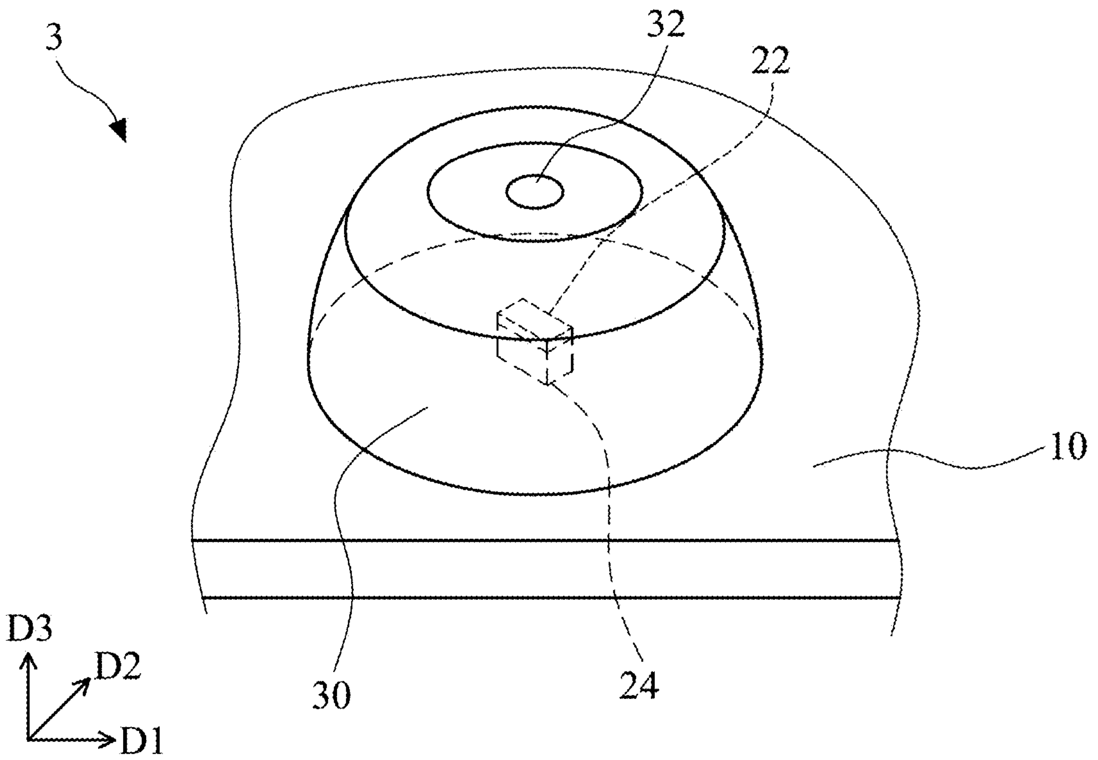
FIG. 8 is a schematic three-dimensional diagram showing a light-emitting device 3 according to some embodiments of the present disclosure.
Figure 9:
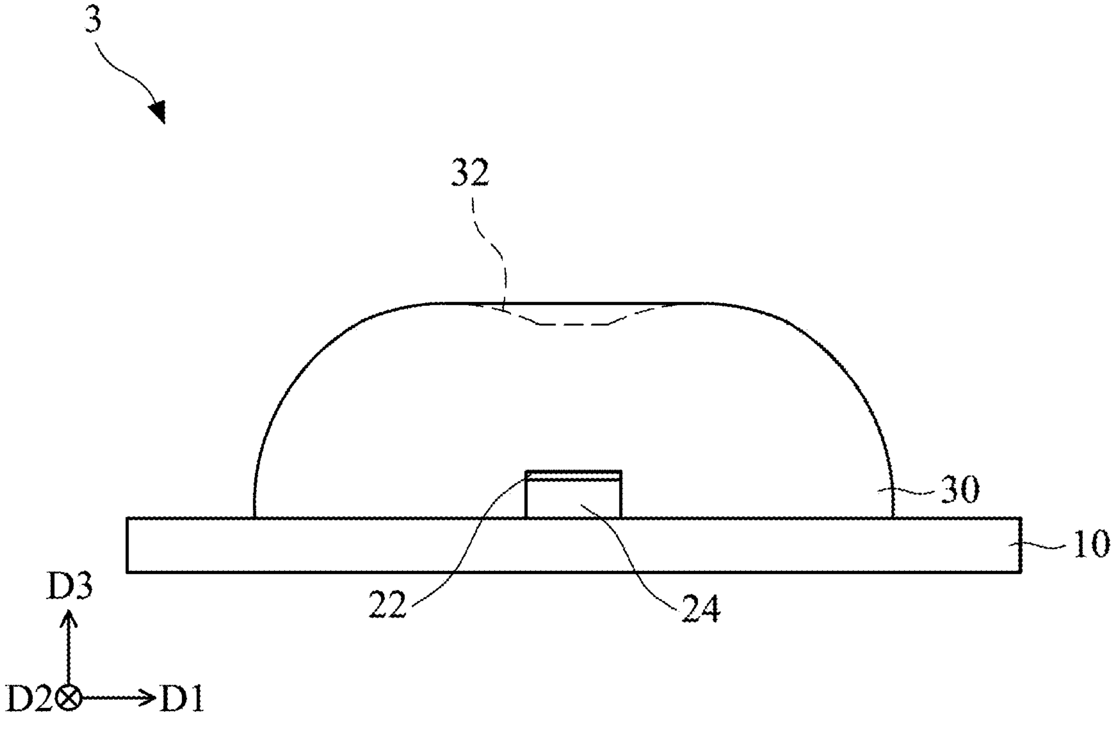
FIG. 9 is a schematic cross-sectional view of a light-emitting device 3 according to some embodiments of the present disclosure.

Referring to FIGS. 8 and 9, they are a schematic three-dimensional diagram and a schematic cross-sectional view showing a light-emitting device 3 according to some embodiments of the present disclosure, respectively. In some embodiments, the light-emitting device 3 may include a light-emitting element 24 and an optical film 22 disposed on the light-emitting element 24. In this embodiment, the light-emitting element 24 may be a blue LED die. The light-emitting characteristics of the light-emitting element 24 may be similar to a point light source. Accordingly, the light-emitting angle of the light-emitting element 24 may be increased.

Figure 10:
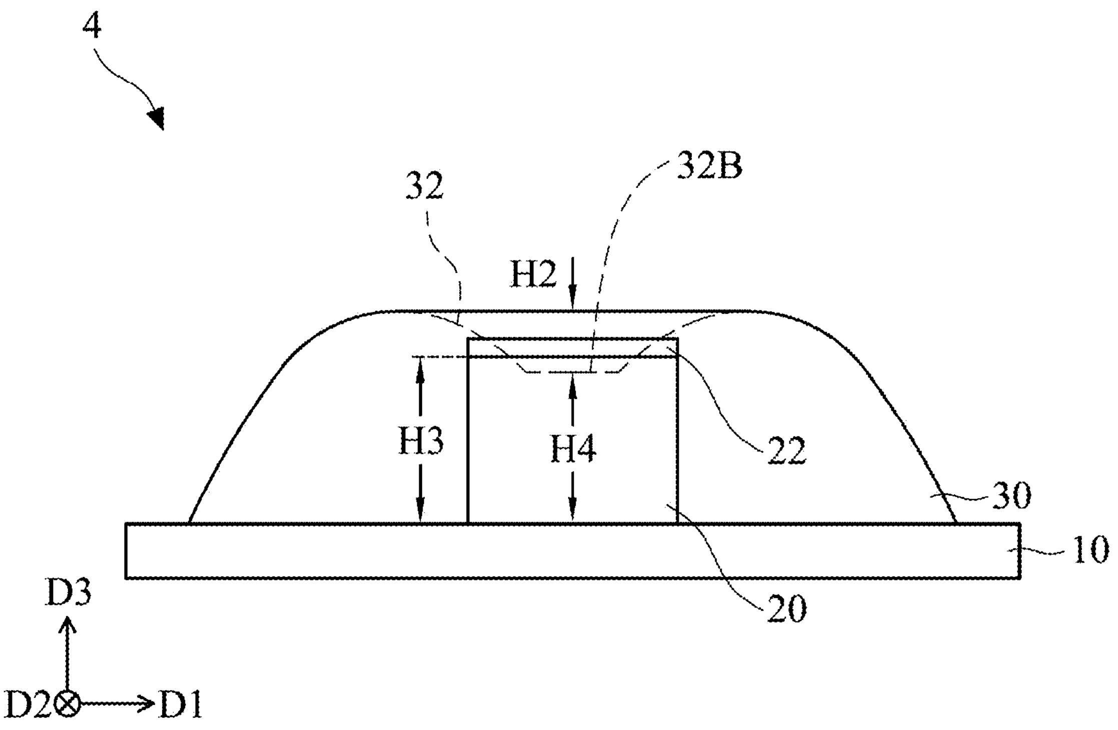
FIG. 10 is a schematic cross-sectional view of a light-emitting device 4 according to some embodiments of the present disclosure.

Referring to FIG. 10, it is a schematic cross-sectional view showing a light-emitting device 4 according to some embodiments of the present disclosure. In some embodiments, the light-emitting device 4 may include the light-emitting element 20, and the recessed portion 32 may expose a portion of the upper surface of the optical film 22 and cover the remaining portion of the upper surface of the optical film 22. In some embodiments, in the third direction D3, the third height H3 of the light-emitting element 20 may be greater than a fourth height H4 between the bottom portion 32B of the recessed portion 32 and the substrate 10. Accordingly, the lateral light-emitting amount of the light-emitting element 20 may be increased.

Figure 11:
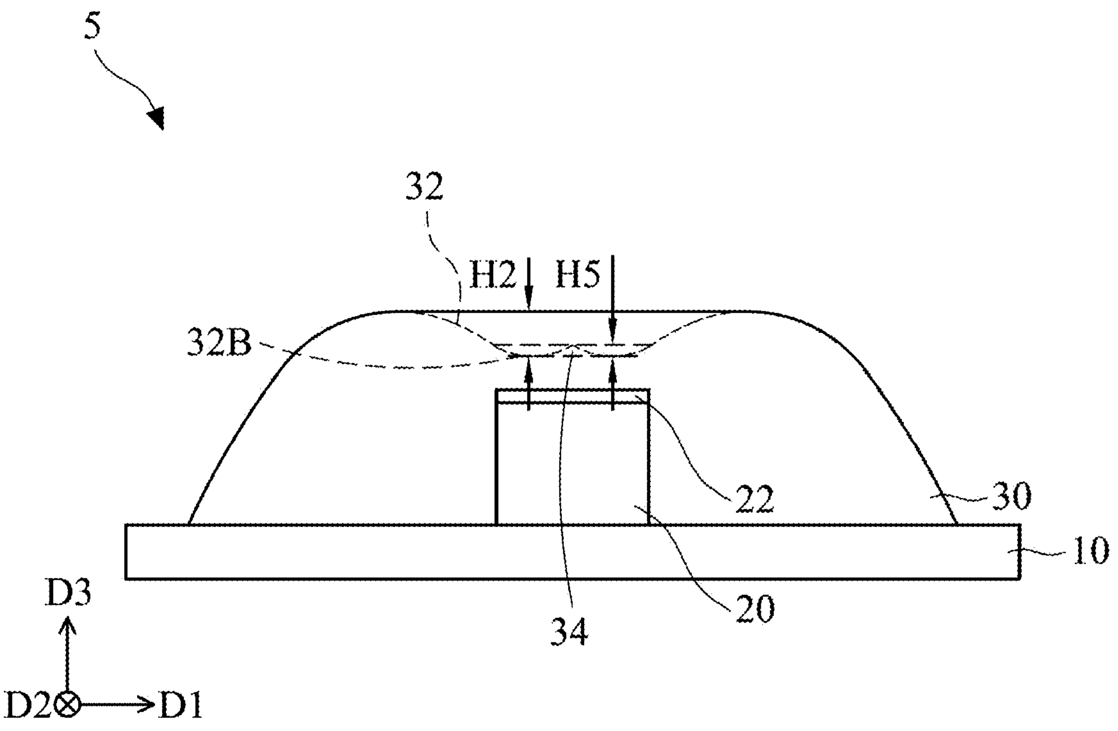
FIG. 11 is a schematic cross-sectional view of a light-emitting device 5 according to some embodiments of the present disclosure.

Referring to FIG. 11, it is a schematic cross-sectional view showing a light-emitting device 5 according to some embodiments of the present disclosure. In some embodiments, the bottom portion 32B of the recessed portion 32 may include a protrusion 34, so that the bottom portion 32B has a curvature variation to adjust the light-emitting angle. In some embodiments, in the third direction D3, based on the bottom portion 32B of the recessed portion 32 as a reference line, the protrusion 34 may have a fifth height H5. In some embodiments, the fifth height H5 of the protrusion 34 may be smaller than the depth (the second height H2) of the recessed portion 32.

In some embodiments, such as the light-emitting devices 6A, 6B, 6C, 6D, 7A, 7B in FIGS. 12 to 18, a reflective material may be disposed in the recessed portion 32. Therefore, by shielding the light with the reflective material in varying degrees, the light intensity in the area directly above the light-emitting device may be decreased and the light spot size may be increased.

Figure 12:
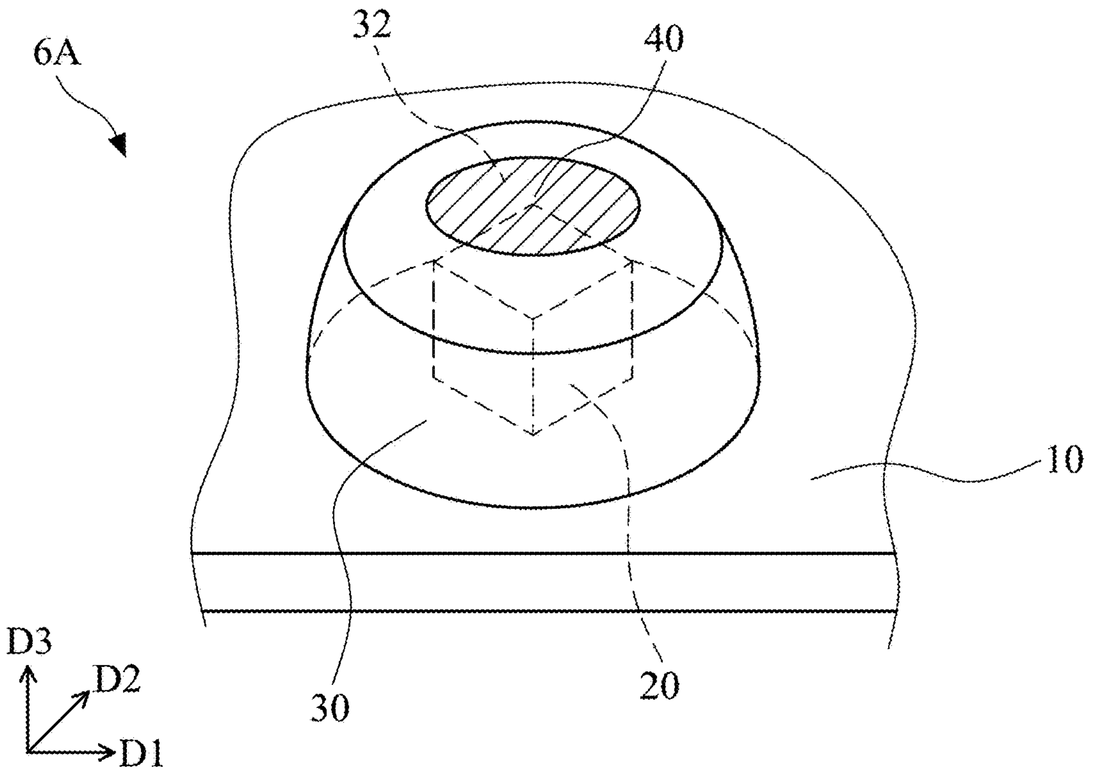
FIG. 12 is a schematic three-dimensional diagram showing a light-emitting device 6A according to some embodiments of the present disclosure.
Figure 13:
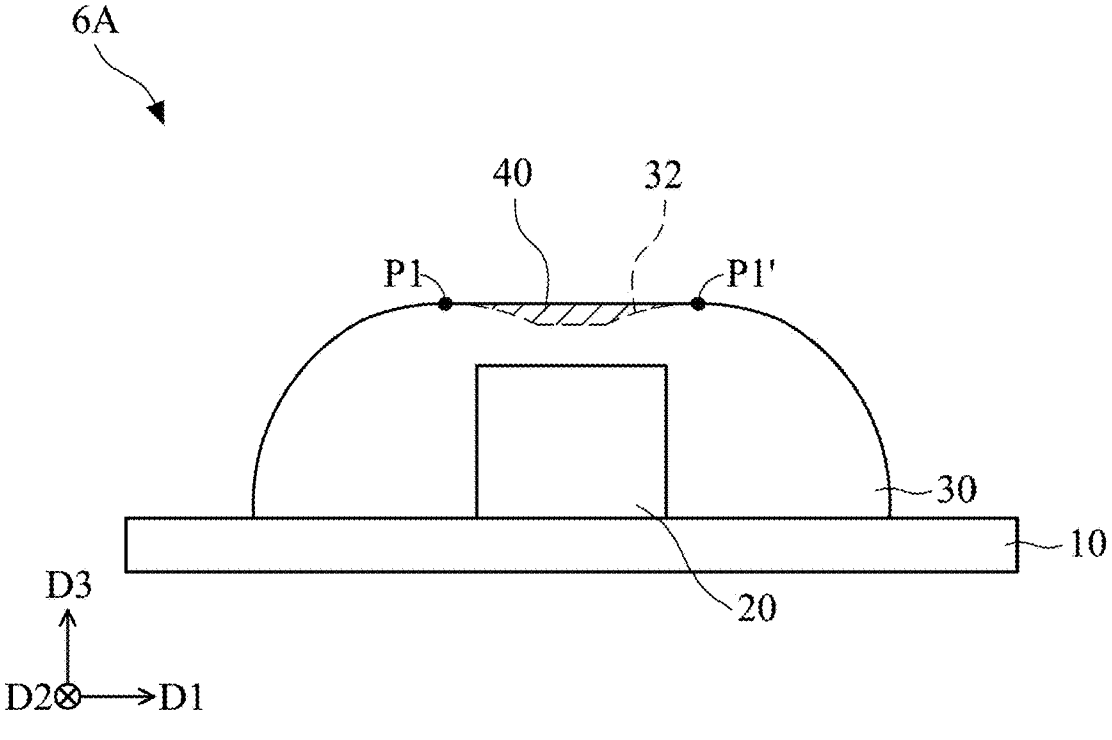
FIG. 13 is a schematic cross-sectional view of a light-emitting device 6A according to some embodiments of the present disclosure.

Referring to FIGS. 12 and 13, they are a schematic three-dimensional diagram and a schematic cross-sectional view showing a light-emitting device 6A according to some embodiments of the present disclosure, respectively. In some embodiments, the light-emitting device 6A may include a reflective layer 40, and the reflective layer 40 may be disposed in the recessed portion 32 of the light-transmissive encapsulant 30. In some embodiments, the reflective layer 40 may include a reflective material. In some embodiments, the reflective material may include a white reflective material, a metal, an alloy, the like, or a combination thereof, but the present disclosure is not limited thereto. In some embodiments, the upper surface of the reflective layer 40 may be aligned with the first point P1, P1'.

Figure 14:
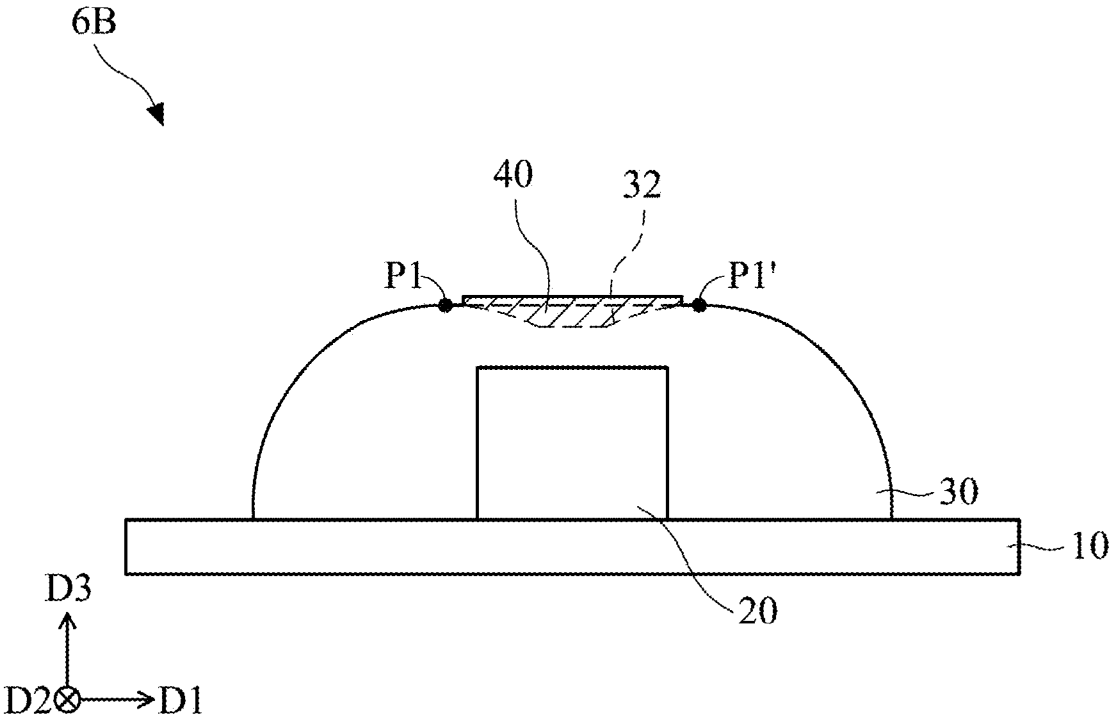
FIG. 14 is a schematic cross-sectional view of a light-emitting device 6B according to some embodiments of the present disclosure.

Referring to FIG. 14, it is a schematic cross-sectional view of a light-emitting device 6B according to some embodiments of the present disclosure. As shown in FIG. 14, in some embodiments, the upper surface of the reflective layer 40 may be higher than the first point P1, P1'.

Figure 15:
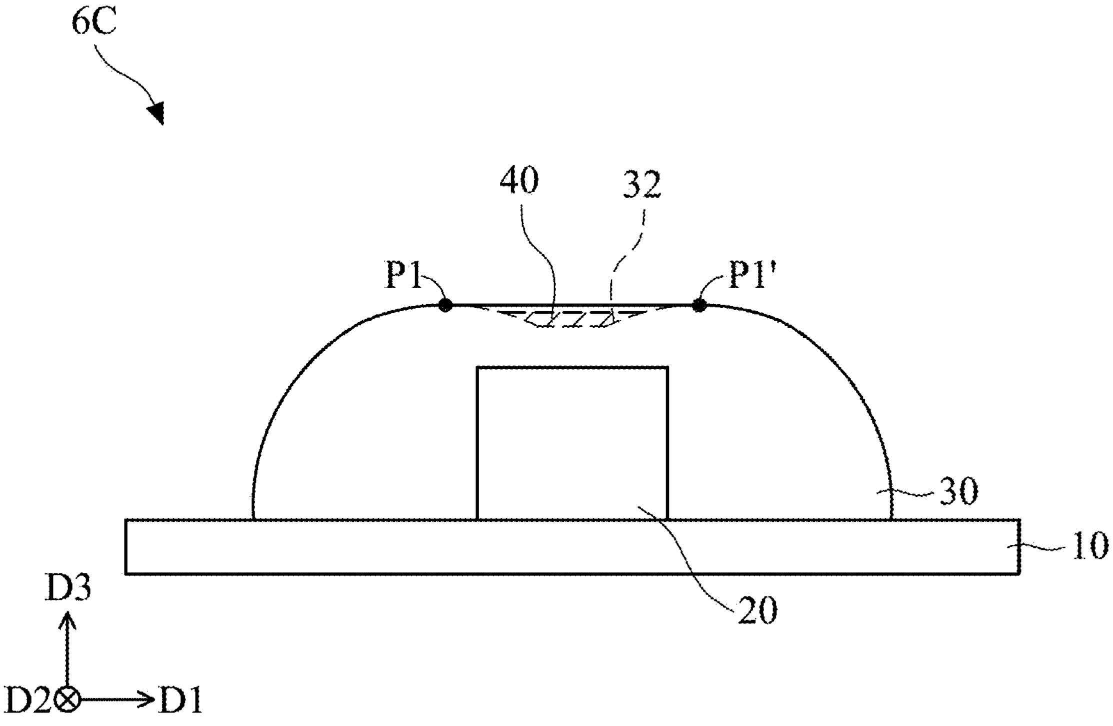
FIG. 15 is a schematic cross-sectional view of a light-emitting device 6C according to some embodiments of the present disclosure.

Referring to FIG. 15, it is a schematic cross-sectional view of a light-emitting device 6C according to some embodiments of the present disclosure. As shown in FIG. 15, in some embodiments, the upper surface of the reflective layer 40 may be lower than the first point P1, P1'. Accordingly, the forward light intensity of the light-emitting device 6C may be adjusted by adjusting the thickness of the reflective layer 40 in the third direction D3. Specifically, as the upper surface of the reflective layer 40 is further away from the upper surface of the substrate 10, the forward light intensity of the light-emitting device 6C may be reduced. When the upper surface of the reflective layer 40 is closer to the upper surface of the substrate 10, the forward light intensity of the light-emitting device 6C may be increased.

Figure 16:
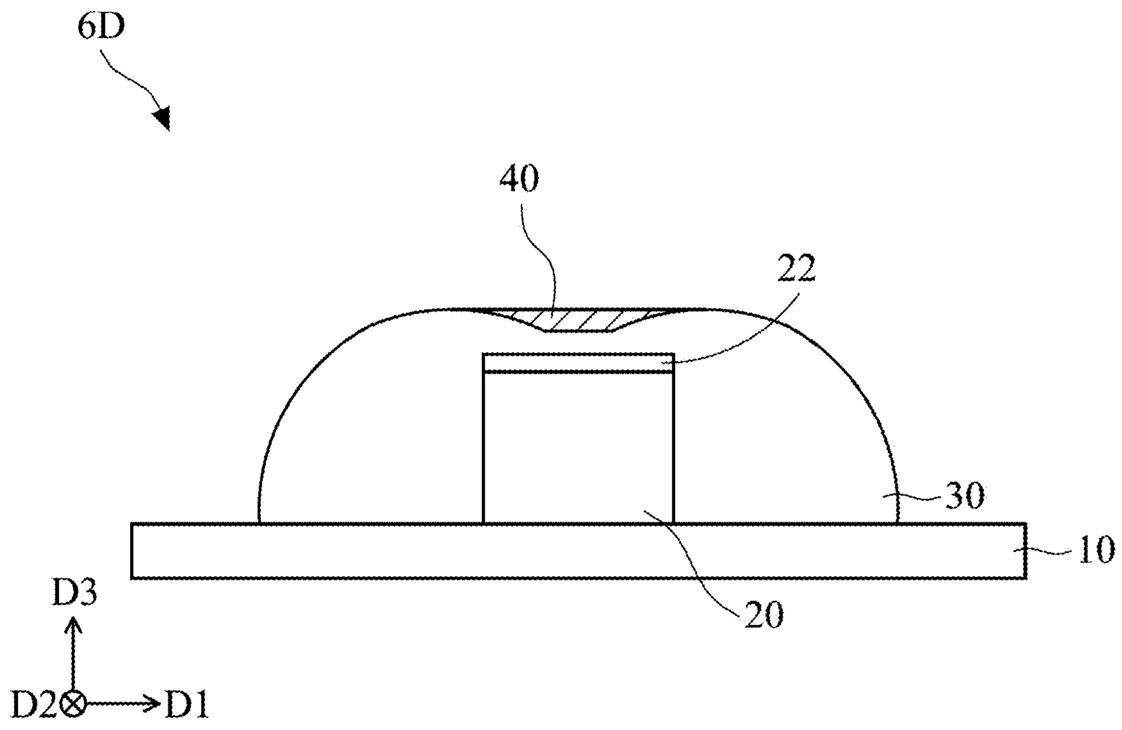
FIG. 16 is a schematic cross-sectional view of a light-emitting device 6D according to some embodiments of the present disclosure.

Referring to FIG. 16, it is a schematic cross-sectional view of a light-emitting device 6D according to some embodiments of the present disclosure. As shown in FIG. 16, in some embodiments, the light-emitting device 6D may include the optical film 22 disposed on the light-emitting element 20 and the reflective layer 40 disposed in the recessed portion 32. In some embodiments, in the third direction D3, the optical film 22 and the reflective layer 40 may be spaced apart by a distance.

Figure 17:
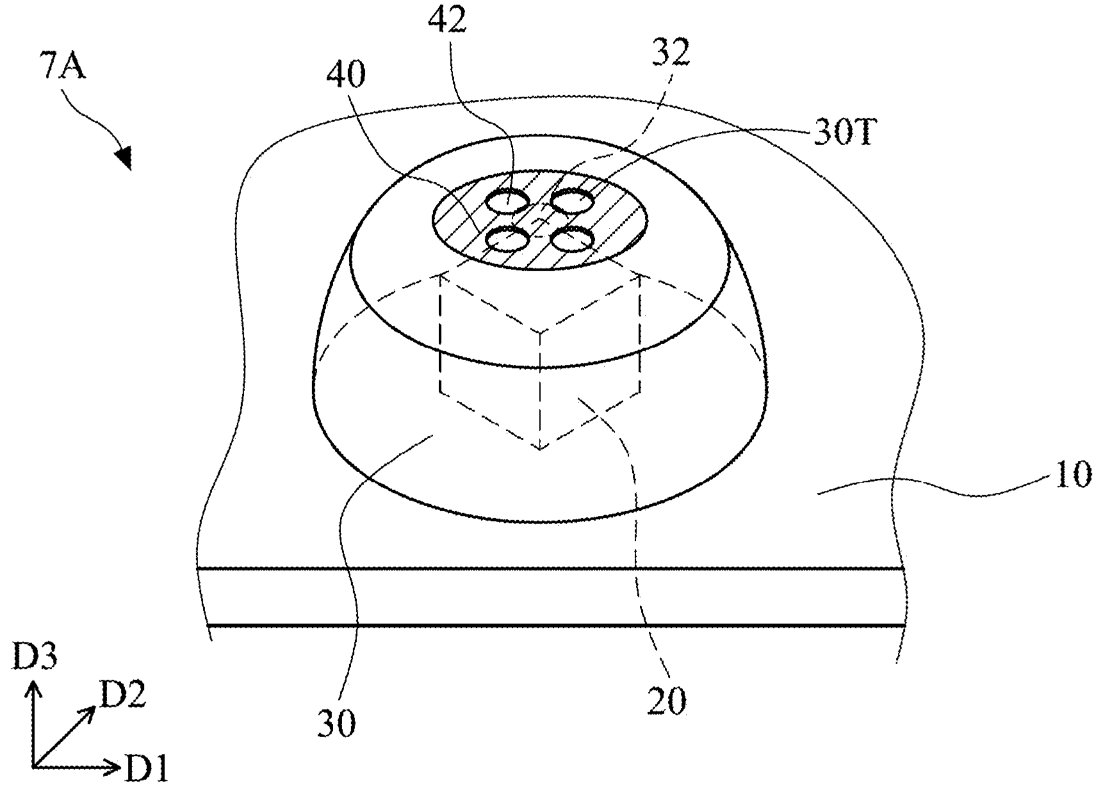
FIG. 17 is a schematic three-dimensional diagram showing a light-emitting device 7A according to some embodiments of the present disclosure.
Figure 18:
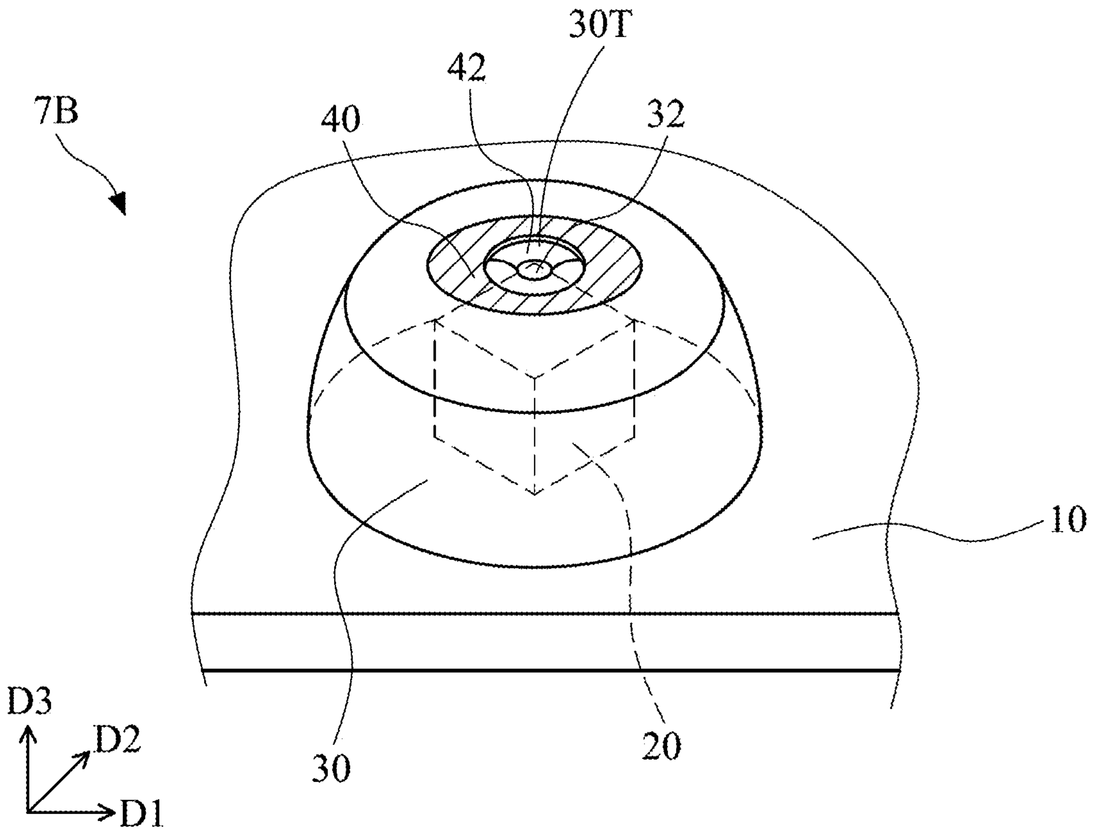
FIG. 18 is a schematic three-dimensional diagram showing a light-emitting device 7B according to some embodiments of the present disclosure.

In some embodiments, for example, as shown in FIG. 17 and FIG. 18, the reflective layer 40 may have a patterned design to enhance the brightness uniformity of the light-emitting module LM.

Referring to FIG. 17, it is a schematic three-dimensional diagram of a light-emitting device 7A according to some embodiments of the present disclosure. As shown in FIG. 17, in some embodiments, the reflective layer 40 may have openings 42, and the openings 42 may expose a portion of the upper surface 30T of the light-transmissive encapsulant 30. In some embodiments, the number, area, shape, or a combination thereof of the openings 42 may be adjusted according to optical property requirements. In some embodiments, the reflective layer 40 may be formed by a screen printing process, but the present disclosure is not limited thereto. In some embodiments, the reflective layer 40 may have four openings 42. In some embodiments, in the third direction D3, the geometric center of the opening 42 does not overlap with the geometric center of the light-emitting element 20.

Referring to FIG. 18, it is a schematic three-dimensional diagram of a light-emitting device 7B according to some embodiments of the present disclosure. In some embodiments, in order to improve the forward light intensity of the light-emitting device 7B, one opening 42 may be provided, and the opening 42 is located directly above the light-emitting element 20. In some embodiments, in the third direction D3, the geometric center of the opening 42 overlaps with the geometric center of the light-emitting element 20.

Figure 19:
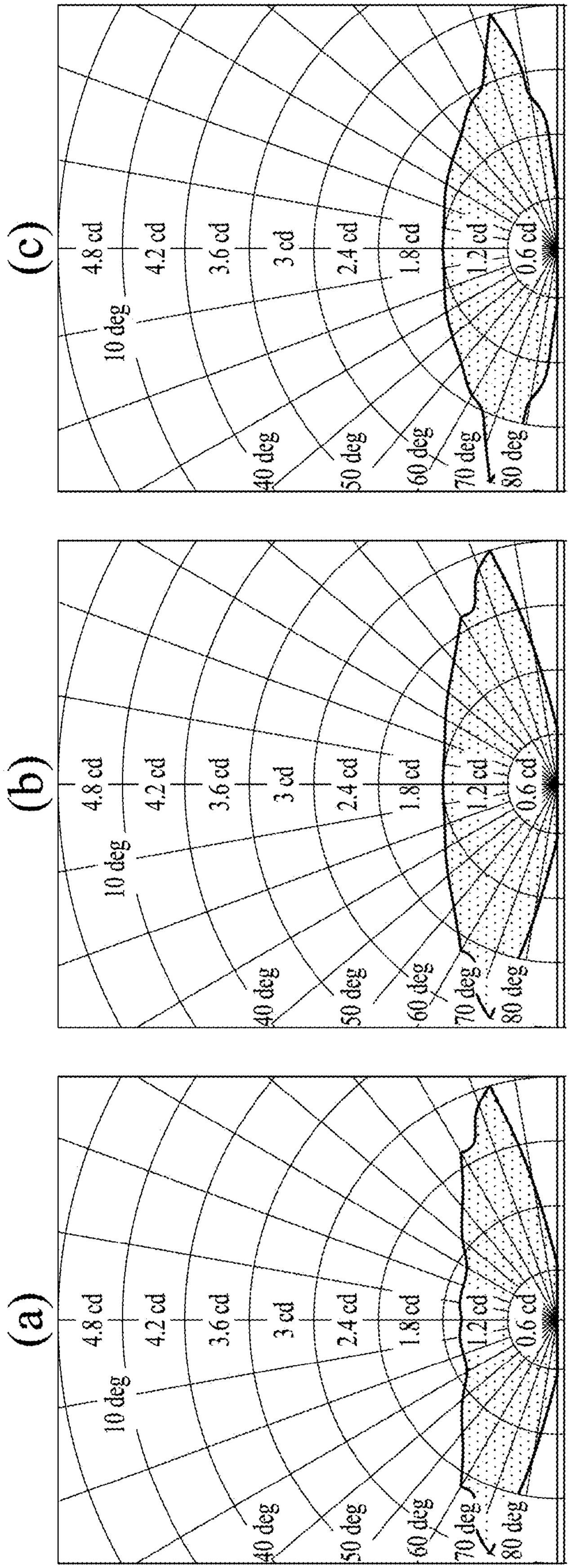
FIG. 19 shows light distribution diagrams of the light-emitting device 1 according to some embodiments of the present disclosure.
Figure 20:
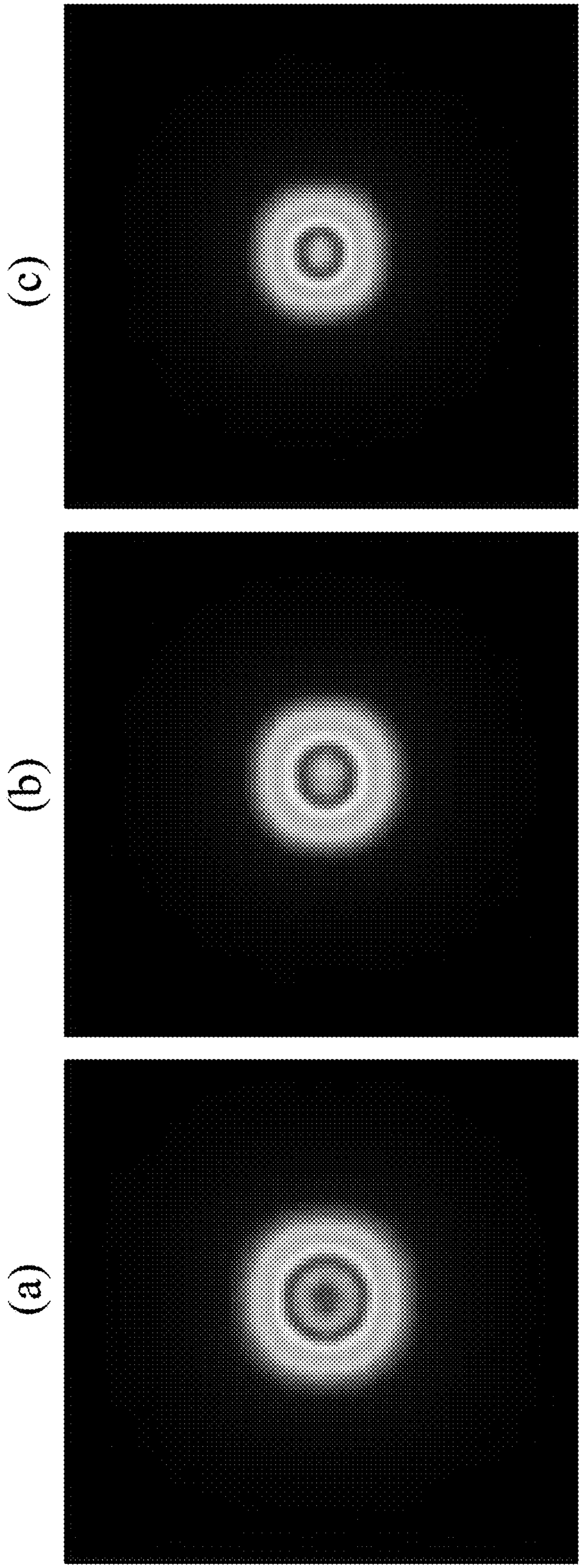
FIG. 20 shows brightness distribution images of the light-emitting device 1 according to some embodiments of the present disclosure.

Referring to FIG. 19 and FIG. 20, they show light distribution diagrams and a brightness distribution images of the light-emitting device 1 according to some embodiments of the present disclosure, respectively. In the light-emitting device 1, the reflective layer 40 is not disposed on the recessed portion 32 of the light-transmissive encapsulant 30, and the light-emitting device 1 is not provided with the optical film 22. The optical distance of the light-emitting device 1 may be 12 mm (that is, OD12). The second width W2 of the light-emitting device 1 in parts (a) of FIGS. 19 and 20 may be 1 mm, the second width W2 of the light-emitting device 1 in parts (b) of FIGS. 19 and 20 may be 0.5 mm, and the second width W2 of the light-emitting device 1 in parts (c) of FIGS. 19 and 20 may be 0.2 mm.

As shown in FIG. 19, when the second width W2 of the bottom portion 32B of the recessed portion 32 is greater, the light-emitting angle of the light-emitting element 20 is greater. In addition, the light pattern of the light emitted by the light-emitting element 20 has a fan shaped light distribution, or a flying saucer shaped light distribution. As shown in FIG. 20, when the second width W2 of the bottom 32B of the recessed portion 32 is greater, the light spot size of the light-emitting element 20 is greater and the brightness distribution is more uniform. Therefore, the present disclosure can significantly increase the light-emitting angle, increase the light spot size, and improve the brightness distribution, and it is suitable for backlight modules.

Figure 21:
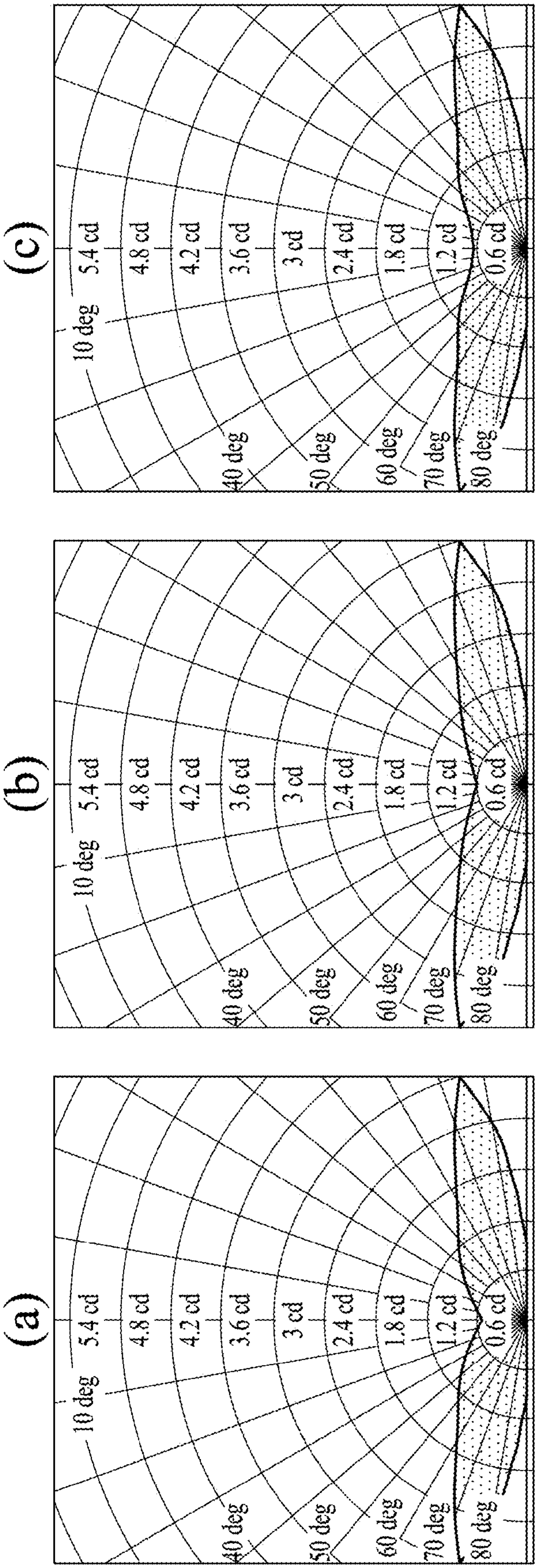
FIG. 21 shows light distribution diagrams of a light-emitting device 6A according to some embodiments of the present disclosure.
Figure 22:
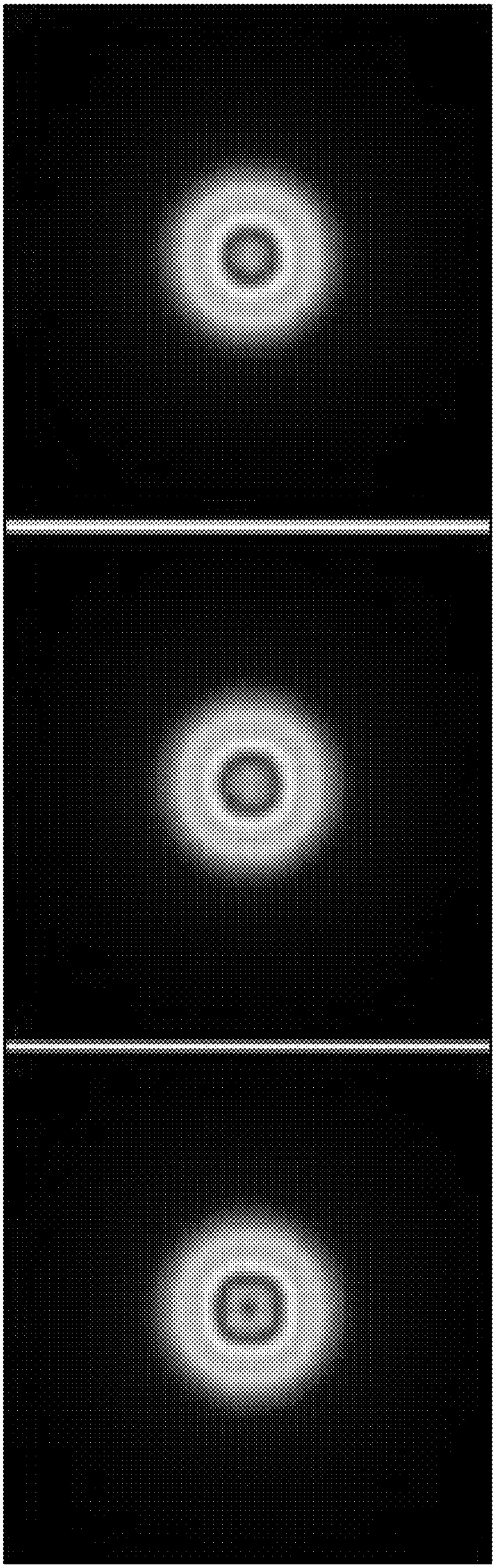
FIG. 22 shows brightness distribution images of the light-emitting device 6A according to some embodiments of the present disclosure.

Referring to FIG. 21 and FIG. 22, they show light distribution diagrams and brightness distribution images of the light-emitting device 6A according to some embodiments of the present disclosure, respectively. Among them, in the light-emitting device 6A, the reflective layer 40 is disposed on the recessed portion 32 of the light-transmissive encapsulant 30, and the light-emitting device 6A is not provided with the optical film 22. The optical distance of the light-emitting device 6A may be 12 mm (that is, OD12). Among them, the second width W2 of the light-emitting device 1 in parts (a) of FIGS. 21 and 22 may be 1 mm, the second width W2 of the light-emitting device 1 in parts (b) of FIGS. 21 and 22 may be 0.5 mm, and the second width W2 of the light-emitting device 1 in parts (c) of FIGS. 21 and 22 may be 0.2 mm.

As shown in FIG. 21, compared with the case where the reflective layer 40 is not provided, when the reflective layer 40 is provided on the recessed portion 32, regardless of the value of the second width W2 of the bottom portion 32B of the recessed portion 32, the light-emitting angle of the light-emitting element 20 may be increased. In addition, the light pattern of the light emitted by the light-emitting element 20 has a batwing shaped light distribution. As shown in FIG. 22, compared with the case where the reflective layer 40 is not provide, when the reflective layer 40 is provided on the recessed portion 32, regardless of the value of the second width W2 of the bottom portion 32B of the recessed portion 32, the light spot size may be increased and the brightness distribution may be more uniform. Therefore, the present disclosure can significantly increase the light-emitting angle, increase the light spot size, and improve the brightness distribution, and it is suitable for backlight modules.

Figure 23:
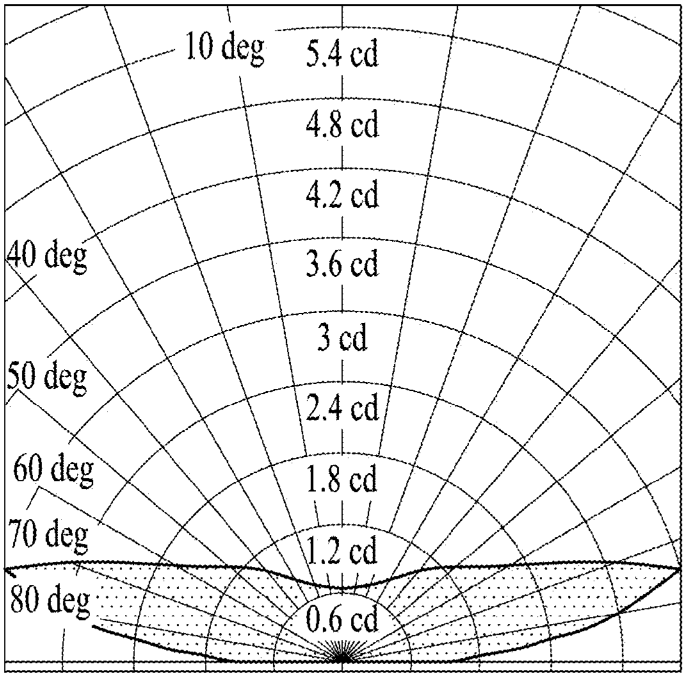
FIG. 23 is a light distribution diagram of a light-emitting device 6D according to some embodiments of the present disclosure.
Figure 24:
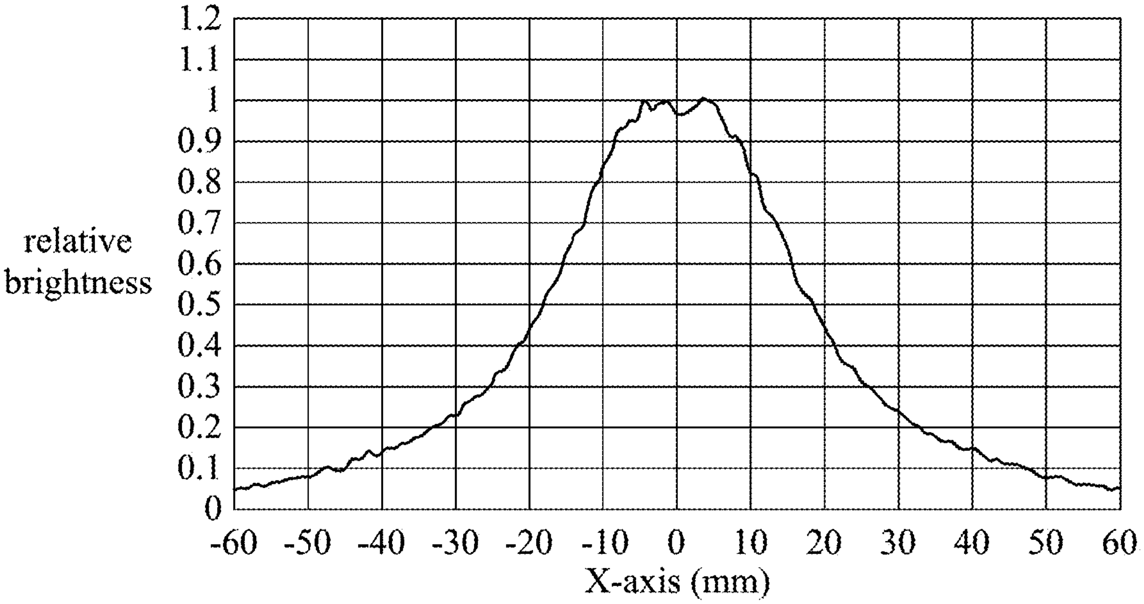
FIG. 24 is a light intensity diagram of a light-emitting device 6D according to some embodiments of the present disclosure.

Referring to FIG. 23 and FIG. 24, they show a light distribution diagram and a light intensity diagram of the light-emitting device 6D according to some embodiments of the present disclosure, respectively. Wherein, in the light-emitting device 6D, the reflective layer 40 is disposed on the recessed portion 32 of the light-transmissive encapsulant 30, and the optical film 22 is disposed on the light-emitting element 20. The optical distance of the light-emitting device 6D may be 3 mm (that is, OD3). Wherein, the second width W2 of the light-emitting device 6D in FIG. 23 and FIG. 24 may be 0.5 mm.

As shown in FIG. 23, compared with the case where the optical film 22 is not provided, when the optical film 22 is provided between the light-emitting element 20 and the light-transmissive encapsulant 30, the light-emitting angle of the light-emitting element 20 may be increased. As shown in FIG. 24, since the light-emitting device 6D includes the optical film 22, the area with relatively large brightness may be enhanced, thereby adjusting the forward light intensity, increasing the light spot size, and making the brightness distribution more uniform. For example, the area with a relative brightness higher than 0.9 may be approximately within plus or minus 8 mm (±8 mm) of the X-axis, the area with a relative brightness higher than 0.8 may be approximately within plus or minus 12 mm (±12 mm) of the X-axis, and the area with a relative brightness higher than 0.5 may be approximately within plus or minus 18 mm (±18 mm) of the X-axis. Therefore, the present disclosure can significantly increase the light-emitting angle, increase the light spot size, and improve the brightness distribution, and it is suitable for backlight modules.

In some embodiments, since the light-emitting angle and the light spot size of single light-emitting element may be increased, the light-emitting device or the display device including the light-emitting element can have better brightness uniformity when having the same overall thickness (for example, the module thickness) and the same number of the light-emitting elements. For example, the brightness uniformity may be increased by about 19%, so that the brightness uniformity reaches 93.9%.

Therefore, in the present disclosure, the forward light intensity of the light-emitting element may be adjusted by the light-transmissive encapsulant, in order to solve the problems of insufficient or excessive forward light intensity of the light-emitting device. In addition, the present disclosure increases the light-emitting angle, increases the light spot size, adjusts the forward light intensity, and improves the brightness distribution of the light-emitting device by adjusting the relative relationships between the light-emitting element, the light-transmissive packaging portion, the reflective layer, the optical film, and/or other elements, for example, the relative setting position, relative size ratio, material selection, etc.

The features among the various embodiments may be arbitrarily combined as long as they do not violate or conflict with the spirit of the disclosure. In addition, the scope of the present disclosure is not limited to the process, machine, manufacturing, material composition, device, method, and step in the specific embodiments described in the specification. A person of ordinary skill in the art will understand current and future processes, machine, manufacturing, material composition, device, method, and step from the content disclosed in some embodiments of the present disclosure, as long as the current or future processes, machine, manufacturing, material composition, device, method, and step performs substantially the same functions or obtain substantially the same results as the present disclosure. Therefore, the scope of the present disclosure includes the abovementioned process, machine, manufacturing, material composition, device, method, and steps. It is not necessary for any embodiment or claim of the present disclosure to achieve all of the objects, advantages, and/or features disclosed herein.

The foregoing outlines features of several embodiments of the present disclosure, so that a person of ordinary skill in the art may better understand the aspects of the present disclosure. A person of ordinary skill in the art should appreciate that the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A light-emitting device, comprising:

a substrate;

a light-emitting element disposed on the substrate; and a light-transmissive encapsulant disposed on the substrate and surrounding the light-emitting element, wherein the light-transmissive encapsulant has an upper surface and a bottom surface, the bottom surface has a first width, and the light-transmissive encapsulant comprises:

a recessed portion located on the upper surface and directly above the light-emitting element and comprising a bottom portion and a sidewall surrounding the bottom portion; and a surrounding portion located on the upper surface, connected to the sidewall of the recessed portion, and extending outward to the bottom surface, wherein a ratio of a second width of the bottom portion to a third width of the light-emitting element is greater than or equal to 0.3, wherein a light pattern emitted by the light-emitting element has a batwing-shaped light distribution, further comprising an optical film disposed between the light-emitting element and the light-transmissive encapsulant, wherein the recessed portion exposes an upper surface of the optical film.

2. The light-emitting device as claimed in claim 1, wherein a ratio of the second width to the first width is less than or equal to 0.5.

3. The light-emitting device as claimed in claim 1, wherein a ratio of the first width to the third width is greater than or equal to 1.5 and less than 5.

4. The light-emitting device as claimed in claim 1, wherein an optical axis parallel to a normal direction of the substrate passes through a center of the recessed portion and intersects the bottom surface at a reference point, and the surrounding portion comprises a curved surface with a highest point, and a first height is between the highest point and the bottom surface.

5. The light-emitting device as claimed in claim 4, wherein a ratio of the first height to a height of the light-emitting element is greater than 1.1 and less than 3.

6. The light-emitting device as claimed in claim 4, wherein a ratio of the first height to the first width of the bottom surface is less than or equal to 0.5.

7. The light-emitting device as claimed in claim 4, wherein a ratio of a depth of the recessed portion to the first height is greater than or equal to 0.05 and less than or equal to 0.5.

8. The light-emitting device as claimed in claim 4, wherein a virtual connection line connects the reference point and the highest point of the curved surface of the surrounding portion, and a first angle between the virtual connection line and the optical axis is greater than 10 degrees and less than 60 degrees.

9. The light-emitting device as claimed in claim 4, wherein a first point is located on the sidewall of the recessed portion, a second point is located on the curved surface of the surrounding portion, and the first point and the second point are located on opposite sides of the highest point.

10. The light-emitting device as claimed in claim 1, wherein the light-transmissive encapsulant comprises:

a first portion; and a second portion surrounding the first portion, wherein the recessed portion is disposed on the first portion and the second portion, wherein a height of the second portion gradually increases in a direction away from an optical axis which is parallel to a normal direction of the substrate and passes through a center of the recessed portion.

11. The light-emitting device as claimed in claim 10, wherein the light-transmissive encapsulant further comprises:

a third portion surrounding the second portion, wherein a height of the third portion gradually decreases in the direction away from the optical axis.

12. The light-emitting device as claimed in claim 1, wherein the optical film comprises a reflective material.

13. The light-emitting device as claimed in claim 1, wherein the bottom portion and the sidewall of the recessed portion together define a recessed opening, and a size of the recessed opening increases along a normal direction of the substrate.

14. A display device, comprising:

a light-emitting device as claimed in claim 1; and an optical layer disposed above the light-emitting device.

* * * * *